US012160944B2

(12) United States Patent
Wilke et al.

(10) Patent No.: US 12,160,944 B2
(45) Date of Patent: Dec. 3, 2024

(54) APPARATUS FOR HEATING SMOKABLE MATERIAL

(71) Applicant: BRITISH AMERICAN TOBACCO (INVESTMENTS) LIMITED, London (GB)

(72) Inventors: Andrew P. Wilke, Madison, WI (US); Benjamin J. Paprocki, Cottage Grove, WI (US); Duane A. Kaufman, Hollandale, WI (US); Thomas P. Blandino, Cottage Grove, WI (US)

(73) Assignee: NICOVENTURES TRADING LIMITED, London (GB)

( * ) Notice: Subject to any disclaimer, the term of this patent is extended or adjusted under 35 U.S.C. 154(b) by 1614 days.

(21) Appl. No.: 16/311,411

(22) PCT Filed: Jun. 27, 2017

(86) PCT No.: PCT/EP2017/065908
§ 371 (c)(1),
(2) Date: Dec. 19, 2018

(87) PCT Pub. No.: WO2018/002085
PCT Pub. Date: Jan. 4, 2018

(65) Prior Publication Data

US 2019/0191780 A1 Jun. 27, 2019

Related U.S. Application Data

(60) Provisional application No. 62/356,334, filed on Jun. 29, 2016.

(51) Int. Cl.
*A24F 40/465* (2020.01)
*A24D 1/20* (2020.01)
(Continued)

(52) U.S. Cl.
CPC ............... *H05B 6/108* (2013.01); *A24D 1/20* (2020.01); *A24F 40/465* (2020.01); *H05B 6/105* (2013.01); *A24F 40/20* (2020.01)

(58) Field of Classification Search
None
See application file for complete search history.

(56) References Cited

U.S. PATENT DOCUMENTS 2,592,554 A 4/1952 Frankenburg
2,860,638 A 11/1958 Frank et al.
(Continued)

FOREIGN PATENT DOCUMENTS

AU 2014369867 A1 6/2016
AU 2017289114 B2 4/2020
(Continued)

OTHER PUBLICATIONS

Application and File History for U.S. Appl. No. 16/647,325, filed Mar. 13, 2020, inventors Abi Aoun et al.
(Continued)

*Primary Examiner* — Tho D Ta
(74) *Attorney, Agent, or Firm* — Husch Blackwell

(57) ABSTRACT

Disclosed is a heating element for use with an apparatus for heating smokable material to volatilize at least one component of the smokable material. The heating element is formed from heating material that is heatable by penetration with a varying magnetic field. First and second portions of the heating element have different respective thermal masses. Also disclosed is an apparatus for heating smokable material to volatilise at least one component of the smokable material, the apparatus including such a heating element. Further disclosed is an article for use with an apparatus for
(Continued)

heating smokable material to volatilize at least one component of the smokable material, wherein the article includes such a heating element.

20 Claims, 3 Drawing Sheets

(51) Int. Cl.
*H05B 6/10* (2006.01)
*A24F 40/20* (2020.01)

(56) References Cited

U.S. PATENT DOCUMENTS 3,065,756 A 11/1962 Noel
3,144,174 A 8/1964 Henry et al.
3,173,612 A 3/1965 Gut et al.
3,517,151 A 6/1970 Mekjean et al.
3,596,034 A 7/1971 Mekjean
4,149,548 A 4/1979 Bradshaw
4,913,168 A 4/1990 Potter et al.
4,944,317 A 7/1990 Thal
5,093,894 A 3/1992 Deevi et al.
5,144,962 A 9/1992 Counts et al.
5,317,132 A 5/1994 Clough et al.
5,369,249 A 11/1994 Kwon
5,613,505 A 3/1997 Campbell et al.
5,649,554 A 7/1997 Sprinkel et al.
6,053,176 A 4/2000 Adams et al.
6,632,407 B1 10/2003 Lau et al.
6,803,550 B2 10/2004 Sharpe et al.
7,185,659 B2 3/2007 Sharpe
7,185,959 B2 3/2007 Mueller et al.
7,810,505 B2 10/2010 Yang
8,459,271 B2 6/2013 Inagaki
8,807,140 B1 8/2014 Scatterday
8,910,640 B2 12/2014 Sears et al.
8,968,848 B2 3/2015 Quella et al.
9,357,803 B2 6/2016 Egoyants et al.
9,554,598 B2 1/2017 Egoyants et al.
9,710,921 B2 7/2017 Wong et al.
9,980,512 B2 5/2018 Collett et al.
10,058,123 B2 * 8/2018 Taluskie ............... A61M 11/041
10,420,372 B2 9/2019 Suzuki et al.
10,524,508 B2 1/2020 Sur et al.
11,363,682 B2 6/2022 Mironov et al.
2002/0005207 A1 1/2002 Wrenn et al.
2002/0038799 A1 4/2002 Laken et al.
2002/0038800 A1 4/2002 Laken et al.
2002/0078951 A1 6/2002 Nichols et al.
2002/0078956 A1 6/2002 Sharpe et al.
2003/0007887 A1 1/2003 Roumpos et al.
2003/0102304 A1 6/2003 Boyers
2003/0230567 A1 12/2003 Centanni et al.
2004/0149297 A1 8/2004 Sharpe
2004/0188418 A1 9/2004 Aisenbrey
2005/0025213 A1 2/2005 Parks
2005/0045193 A1 3/2005 Yang
2007/0267409 A1 11/2007 Gard et al.
2009/0120928 A1 5/2009 Lee et al.
2009/0151717 A1 6/2009 Bowen et al.
2009/0293888 A1 12/2009 Williams et al.
2010/0024834 A1 2/2010 Oglesby et al.
2010/0181387 A1 7/2010 Zaffaroni et al.
2011/0240022 A1 10/2011 Hodges et al.
2011/0271971 A1 11/2011 Conner et al.
2012/0145703 A1 6/2012 Matsen
2012/0214926 A1 8/2012 Berthold et al.
2012/0234315 A1 9/2012 Li et al.
2012/0305545 A1 12/2012 Brosnan et al.
2013/0030125 A1 1/2013 Buryak et al.
2013/0133675 A1 5/2013 Shinozaki et al.
2013/0160780 A1 6/2013 Matsumoto et al.
2014/0060554 A1 3/2014 Collett et al.
2014/0096782 A1 * 4/2014 Ampolini ................ A24F 40/53
131/328
2014/0158144 A1 6/2014 Kaljura et al.
2014/0216485 A1 8/2014 Egoyants et al.
2014/0224267 A1 8/2014 Levitz et al.
2014/0301721 A1 10/2014 Ruscio et al.
2015/0040925 A1 2/2015 Saleem et al.
2015/0043123 A1 2/2015 Cox
2015/0181937 A1 7/2015 Dubief et al.
2015/0201670 A1 7/2015 Crooks et al.
2015/0201675 A1 7/2015 Lord
2015/0237913 A1 8/2015 Suzuki et al.
2015/0245669 A1 9/2015 Cadieux et al.
2015/0260047 A1 9/2015 Gieras et al.
2015/0272219 A1 10/2015 Hatrick et al.
2015/0335062 A1 11/2015 Shinkawa et al.
2016/0007652 A1 1/2016 Taluskie et al.
2016/0012022 A1 1/2016 Lim
2016/0120221 A1 5/2016 Mironov et al.
2016/0150825 A1 6/2016 Mironov et al.
2016/0192708 A1 7/2016 DeMeritt et al.
2016/0324215 A1 11/2016 Mironov et al.
2016/0331031 A1 11/2016 Malgat et al.
2017/0055574 A1 3/2017 Kaufman et al.
2017/0055575 A1 3/2017 Wilke et al.
2017/0055580 A1 3/2017 Blandino et al.
2017/0055581 A1 3/2017 Wilke et al.
2017/0055582 A1 3/2017 Blandino et al.
2017/0055583 A1 3/2017 Blandino et al.
2017/0055584 A1 3/2017 Blandino et al.
2017/0055585 A1 3/2017 Fursa et al.
2017/0071250 A1 3/2017 Mironov et al.
2017/0095006 A1 4/2017 Egoyants et al.
2017/0119046 A1 5/2017 Kaufman et al.
2017/0119047 A1 5/2017 Blandino et al.
2017/0119048 A1 5/2017 Kaufman et al.
2017/0119049 A1 5/2017 Blandino et al.
2017/0119050 A1 5/2017 Blandino et al.
2017/0119051 A1 5/2017 Blandino et al.
2017/0156403 A1 6/2017 Gill et al.
2017/0174418 A1 6/2017 Cai
2017/0199048 A1 7/2017 Igumnov et al.
2017/0224015 A1 8/2017 Basil et al.
2017/0251718 A1 9/2017 Armoush et al.
2017/0325506 A1 11/2017 Batista
2018/0228217 A1 8/2018 Mironov et al.
2018/0235279 A1 8/2018 Wilke et al.
2018/0242633 A1 8/2018 Wilke et al.
2018/0242636 A1 8/2018 Blandino et al.
2018/0279677 A1 10/2018 Blandino et al.
2018/0317552 A1 11/2018 Kaufman et al.
2018/0317553 A1 11/2018 Blandino et al.
2018/0317555 A1 11/2018 Blandino et al.
2018/0325173 A1 11/2018 Blandino et al.
2018/0360123 A1 12/2018 Silvestrini
2019/0159517 A1 5/2019 Ballesteros Gomez et al.
2019/0230988 A1 * 8/2019 Aoun ...................... A24D 1/20
2019/0239555 A1 8/2019 Nicholson
2020/0054068 A1 2/2020 Blandino et al.
2020/0054069 A1 2/2020 Blandino et al.
2020/0229497 A1 7/2020 Aoun et al.
2020/0268053 A1 8/2020 Thorsen et al.
2020/0288774 A1 9/2020 Blandino et al.
2021/0100281 A1 4/2021 Abi Aoun et al.
2022/0015408 A1 1/2022 Blandino et al.

FOREIGN PATENT DOCUMENTS

CA 2003521 A1 5/1990
CA 2003522 A1 5/1990
CA 2937722 A1 11/2015
CA 2974770 A1 12/2015
CA 2982164 A1 10/2016
CA 3002424 A1 4/2017
CN 1126426 A 7/1996
CN 2393205 Y 8/2000
CN 2738167 Y 11/2005
CN 2924411 Y 7/2007
CN 101084801 A 12/2007

(56) References Cited

FOREIGN PATENT DOCUMENTS

| | | | |
|---|---|---|---|
| CN | 201076006 | Y | 6/2008 |
| CN | 201088138 | Y | 7/2008 |
| CN | 101277623 | A | 10/2008 |
| CN | 101326138 | A | 12/2008 |
| CN | 101390659 | A | 3/2009 |
| CN | 201199922 | Y | 3/2009 |
| CN | 101951796 | A | 1/2011 |
| CN | 201762288 | U | 3/2011 |
| CN | 101326138 | B | 1/2013 |
| CN | 103202540 | A | 7/2013 |
| CN | 203369386 | U | 1/2014 |
| CN | 203435685 | U | 2/2014 |
| CN | 103689812 | A | 4/2014 |
| CN | 203735483 | U | 7/2014 |
| CN | 103988576 | A | 8/2014 |
| CN | 203748687 | U | 8/2014 |
| CN | 203762288 | U | 8/2014 |
| CN | 104013109 | A | 9/2014 |
| CN | 104095291 | A | 10/2014 |
| CN | 104256899 | A | 1/2015 |
| CN | 204091003 | U | 1/2015 |
| CN | 104365175 | A | 2/2015 |
| CN | 104470387 | A | 3/2015 |
| CN | 104480800 | A | 4/2015 |
| CN | 104619202 | A | 5/2015 |
| CN | 104664608 | A | 6/2015 |
| CN | 104768407 | A | 7/2015 |
| CN | 204519366 | U | 8/2015 |
| CN | 204539505 | U | 8/2015 |
| CN | 204599333 | U | 9/2015 |
| CN | 104994757 | A | 10/2015 |
| CN | 105188425 | A | 12/2015 |
| CN | 105682488 | A | 6/2016 |
| CN | 104095291 | B | 1/2017 |
| EA | 009116 | B1 | 10/2007 |
| EP | 0430559 | A2 | 6/1991 |
| EP | 0430566 | A2 | 6/1991 |
| EP | 0488488 | A1 | 6/1992 |
| EP | 0703735 | A1 | 4/1996 |
| EP | 0703735 | B1 | 7/2001 |
| EP | 1357025 | A2 | 10/2003 |
| EP | 1454840 | A1 | 9/2004 |
| EP | 1454840 | B1 | 9/2006 |
| EP | 1940254 | A2 | 7/2008 |
| EP | 2059091 | A2 | 5/2009 |
| EP | 1357025 | B1 | 7/2009 |
| EP | 2186833 | A1 | 5/2010 |
| EP | 2316286 | A1 | 5/2011 |
| EP | 2327318 | A1 | 6/2011 |
| EP | 2444112 | A1 | 4/2012 |
| EP | 2253541 | B1 | 5/2012 |
| EP | 2460424 | | 6/2012 |
| EP | 2903552 | A1 | 8/2015 |
| EP | 2907397 | A1 | 8/2015 |
| EP | 3367823 | A2 | 9/2018 |
| EP | 3542747 | A1 | 9/2019 |
| EP | 3632244 | A1 | 4/2020 |
| GB | 347650 | A | 4/1931 |
| GB | 2495923 | A | 5/2013 |
| GB | 2504732 | A | 2/2014 |
| GB | 2504733 | A | 2/2014 |
| JP | S457120 | Y1 | 4/1970 |
| JP | H03113366 | A | 5/1991 |
| JP | H0556298 | U | 7/1993 |
| JP | H07502188 | A | 3/1995 |
| JP | H0850422 | A | 2/1996 |
| JP | H0851175 | A | 2/1996 |
| JP | H08511175 | A | 11/1996 |
| JP | H09509845 | A | 10/1997 |
| JP | 2001174054 | A | 6/2001 |
| JP | 2002043047 | A | 2/2002 |
| JP | 2002144451 | A | 5/2002 |
| JP | 2002252078 | A | 9/2002 |
| JP | 2004121594 | A | 4/2004 |
| JP | 3588469 | B2 | 11/2004 |
| JP | 2004331191 | A | 11/2004 |
| JP | 2008050422 | A | 3/2008 |
| JP | 2008511175 | A | 4/2008 |
| JP | 2009087703 | A | 4/2009 |
| JP | 2010022754 | A | 2/2010 |
| JP | 2010050834 | A | 3/2010 |
| JP | 2010508034 | A | 3/2010 |
| JP | 2013013441 | A | 1/2013 |
| JP | 2013515465 | A | 5/2013 |
| JP | 2015524261 | A | 8/2015 |
| JP | 2015531601 | A | 11/2015 |
| JP | 2016508744 | A | 3/2016 |
| JP | 2016516402 | A | 6/2016 |
| JP | 2016538842 | A | 12/2016 |
| JP | 6077145 | B2 | 2/2017 |
| JP | 2017515490 | A | 6/2017 |
| JP | 2017526381 | A | 9/2017 |
| JP | 2020512487 | A | 4/2020 |
| JP | 6875044 | B2 | 5/2021 |
| JP | 6933323 | B2 | 9/2021 |
| JP | 7105289 | B2 | 7/2022 |
| KR | 880701636 | A | 11/1988 |
| KR | 100385395 | B1 | 8/2003 |
| KR | 100449444 | B1 | 8/2005 |
| KR | 20100108565 | A | 10/2010 |
| KR | 20130029697 | A | 3/2013 |
| KR | 20140093659 | A | 7/2014 |
| KR | 20150027069 | A | 3/2015 |
| KR | 20150040012 | A | 4/2015 |
| KR | 20150047616 | A | 5/2015 |
| KR | 20150132112 | A | 11/2015 |
| KR | 20150143877 | A | 12/2015 |
| KR | 20160064159 | A | 6/2016 |
| KR | 20170008209 | A | 1/2017 |
| RU | 2132629 | C1 | 7/1999 |
| RU | 2135054 | C1 | 8/1999 |
| RU | 103281 | U1 | 4/2011 |
| RU | 2425608 | C2 | 8/2011 |
| RU | 2509516 | C2 | 3/2014 |
| RU | 2531890 | C2 | 10/2014 |
| RU | 2015106592 | A | 11/2016 |
| RU | 2682772 | C1 | 3/2019 |
| UA | 125609 | C2 | 5/2022 |
| WO | WO-8404698 | A1 | 12/1984 |
| WO | WO-9409842 | A1 | 5/1994 |
| WO | 9527411 | A1 | 10/1995 |
| WO | 9527412 | A1 | 10/1995 |
| WO | WO 9527411 | | 10/1995 |
| WO | WO-9618662 | A1 | 6/1996 |
| WO | WO-02089532 | A1 | 11/2002 |
| WO | WO-02098389 | A1 | 12/2002 |
| WO | WO-2007051163 | A2 | 5/2007 |
| WO | 2008015441 | A1 | 2/2008 |
| WO | WO-2009079641 | A2 | 6/2009 |
| WO | 2010113702 | A1 | 10/2010 |
| WO | 2010133342 | A1 | 11/2010 |
| WO | WO-2011130414 | A1 | 10/2011 |
| WO | WO-2012134117 | A2 | 10/2012 |
| WO | 2012164009 | A2 | 12/2012 |
| WO | WO-2013034459 | A1 | 3/2013 |
| WO | 2013098409 | A1 | 7/2013 |
| WO | WO-2013098395 | A1 | 7/2013 |
| WO | 2013131763 | A1 | 9/2013 |
| WO | WO-2013131764 | A1 | 9/2013 |
| WO | WO-2013144324 | A1 | 10/2013 |
| WO | 2013178766 | A1 | 12/2013 |
| WO | 2014023965 | A1 | 2/2014 |
| WO | WO-2014023967 | A1 | 2/2014 |
| WO | 2014061477 | A1 | 4/2014 |
| WO | WO-2014048745 | A1 | 4/2014 |
| WO | WO 2014054035 | | 4/2014 |
| WO | WO-2014102092 | A1 | 7/2014 |
| WO | WO-2014104078 | A1 | 7/2014 |
| WO | WO 2014139611 | | 9/2014 |
| WO | WO-2014140320 | A1 | 9/2014 |
| WO | WO-2015019101 | A1 | 2/2015 |
| WO | 2015071682 | A1 | 5/2015 |
| WO | WO 2015062983 | | 5/2015 |
| WO | 2015082649 | A1 | 6/2015 |

(56) References Cited

FOREIGN PATENT DOCUMENTS

| | | | |
|---|---|---|---|
| WO | 2015082653 | A1 | 6/2015 |
| WO | WO-2015082648 | A1 | 6/2015 |
| WO | WO 2015082651 | | 6/2015 |
| WO | WO-2015082652 | A1 | 6/2015 |
| WO | WO-2015100361 | A1 | 7/2015 |
| WO | WO-2015101479 | A1 | 7/2015 |
| WO | 2015117701 | A1 | 8/2015 |
| WO | WO-2015116934 | A1 | 8/2015 |
| WO | WO-2015117702 | A1 | 8/2015 |
| WO | WO 2015131058 | | 9/2015 |
| WO | WO-2015155289 | A1 | 10/2015 |
| WO | 2015166245 | A2 | 11/2015 |
| WO | 2015176898 | A1 | 11/2015 |
| WO | 2015177043 | A1 | 11/2015 |
| WO | WO 2015/177294 | | 11/2015 |
| WO | WO 2015166245 | | 11/2015 |
| WO | WO-2015175568 | A1 | 11/2015 |
| WO | WO 2015176898 | | 11/2015 |
| WO | WO 2015177044 | | 11/2015 |
| WO | WO-2015177045 | A1 | 11/2015 |
| WO | WO-2015177046 | A1 | 11/2015 |
| WO | WO-2015177247 | A1 | 11/2015 |
| WO | WO-2015177253 | A1 | 11/2015 |
| WO | WO-2015177255 | A1 | 11/2015 |
| WO | WO-2015177257 | A1 | 11/2015 |
| WO | WO 2015177264 | | 11/2015 |
| WO | 2015197863 | A1 | 12/2015 |
| WO | WO-2015198015 | A1 | 12/2015 |
| WO | 2016023965 | A1 | 2/2016 |
| WO | WO-2016075426 | A1 | 5/2016 |
| WO | WO-2016075436 | A1 | 5/2016 |
| WO | 2016088037 | A1 | 6/2016 |
| WO | WO-2016096865 | A2 | 6/2016 |
| WO | 2017036957 | A1 | 8/2016 |
| WO | WO-2016162446 | A1 | 10/2016 |
| WO | WO-2016207407 | A1 | 12/2016 |
| WO | WO-2017005705 | A1 | 1/2017 |
| WO | WO-2017029269 | A1 | 2/2017 |
| WO | 2017036950 | A2 | 3/2017 |
| WO | 2017036954 | A1 | 3/2017 |
| WO | 2017036955 | A2 | 3/2017 |
| WO | 2017036958 | A2 | 3/2017 |
| WO | WO-2017036951 | A1 | 3/2017 |
| WO | WO-2017036959 | A1 | 3/2017 |
| WO | 2017036958 | A3 | 4/2017 |
| WO | WO-2017068098 | A1 | 4/2017 |
| WO | 2017072145 | A1 | 5/2017 |
| WO | 2017072146 | A1 | 5/2017 |
| WO | 2017072147 | A2 | 5/2017 |
| WO | 2017072149 | A1 | 5/2017 |
| WO | WO-2017072148 | A1 | 5/2017 |
| WO | WO-2017072147 | A3 | 7/2017 |
| WO | 2017167932 | A1 | 10/2017 |
| WO | 2018002085 | A1 | 1/2018 |

OTHER PUBLICATIONS

Application and File History for U.S. Appl. No. 16/311,418, filed Dec. 19, 2018, inventors Abi Aoun et al.
Application and File History for U.S. Appl. No. 15/772,391, filed Apr. 30, 2018, inventor Duane A Kaufman.
Application and File History for U.S. Appl. No. 15/772,399, filed Apr. 30, 2018, inventor Thomas P. Blandino.
Application and File History for U.S. Appl. No. 15/772,394, filed Apr. 30, 2018, inventors Blandino et al.
Application and File History for U.S. Appl. No. 16/311,405, filed Dec. 19, 2018, inventors Abi Aoun et al.
Examination Report for Australian Application No. 2016313708, mailed on Nov. 1, 2019, 7 pages.
Examination Report for Australian Application No. 2016313708, mailed on Nov. 23, 2018, 6 pages.
Examination Report mailed Sep. 6, 2019 for Australian Application No. 2017289114, 7 pages.
Examination Report No. 1 for Australian Patent Application No. 2018334042 dated Dec. 16, 2020, 4 pages.
First Office Action and Search Report dated Mar. 4, 2020 for Chinese Application No. 201680077608.1 filed Oct. 26, 2016, 18 pages.
International Preliminary Report on Patentability for Application No. PCT/EP2016/075735, mailed on Jan. 2, 2018, 8 pages.
International Preliminary Report on Patentability for Application No. PCT/EP2016/075737, mailed on May 11, 2018, 10 pages.
International Preliminary Report on Patentability for Application No. PCT/EP2016/075738, mailed on May 11, 2018, 9 pages.
International Preliminary Report on Patentability for Application No. PCT/EP2017/065906, mailed on Jan. 10, 2019, 9 pages.
International Preliminary Report on Patentability for Application No. PCT/EP2017/065908, mailed on Jan. 10, 2019, 9 pages.
International Preliminary Report on Patentability for Application No. PCT/EP2018/075093, mailed on Mar. 26, 2020, 8 pages.
International Preliminary Report on Patentability for Application No. PCT/EP2017/065909,mailed on Jan. 10, 2019, 7 pages.
International Search Report and Written Opinion for Application No. PCT/EP2016/070190, mailed on Mar. 13, 2017, 19 pages.
International Search Report and Written Opinion for Application No. PCT/EP2016/075735, mailed on Feb. 2, 2017, 10 pages.
International Search Report and Written Opinion for Application No. PCT/EP2016/075736, mailed on Feb. 14, 2017, 6 pages.
International Search Report and Written Opinion for Application No. PCT/EP2016/075737, mailed on Jun. 16, 2017, 14 pages.
International Search Report and Written Opinion for Application No. PCT/EP2016/075738, mailed on Mar. 2, 2017, 12 pages.
International Search Report and Written Opinion for Application No. PCT/EP2017/065906, mailed on Oct. 24, 2017, 16 pages.
International Search Report and Written Opinion for Application No. PCT/EP2017/065909, mailed on Oct. 24, 2017, 10 pages.
International Search Report and Written Opinion for Application No. PCT/EP2018/075093, mailed on Jan. 4, 2019, 11 pages.
Iorga A., et al., "Low Curie Temperature in Fe—Cr—Ni—Mn Alloys," U.P.B. Sci.Bull., Series B, vol. 73 (4), 2011, pp. 195-202.
Neomax Materials Co., Ltd., "NeoMax MS-135," retrieved from http://www.neomax-materials.co.jp/eng/pr0510.htm, as accessed on Oct. 30, 2015, 2 pages.
Notice of Reasons For Refusal Office Action mailed Sep. 8, 2020 for Japanese Application No. 2018-567856, 8 pages.
Notice of Reasons For Rejection Office Action mailed Mar. 17, 2020 for Japanese Application No. 2018-522061, 7 pages.
Office Action and Search Report mailed Apr. 14, 2020 for Chinese Application No. 201680063711.0, 28 pages.
Office Action dated Jun. 25, 2019 for Japanese Application No. 2018-521546, 4 pages.
Office Action for Chinese Application No. 201780039879.2 mailed on Sep. 18, 2020, 7 pages.
Office Action mailed Mar. 1, 2019 for Canadian Application No. 2996341, 4 pages.
Office Action mailed Sep. 9, 2020 for Chinese Application No. 201780040874.1, 20 pages.
Office Action mailed Dec. 11, 2019 for Brazilian Application No. BR1120180085138, 6 pages.
Office Action mailed Sep. 15, 2020 for Japanese Application No. 2018-567854, 8 pages.
Office Action mailed Aug. 19, 2020 for KR Application No. 20187037693, filed Jun. 27, 2017, 21 pages.
Office Action mailed Mar. 22, 2019 for Korean Application No. 10-2018-7012422, 19 pages.
Office Action mailed Mar. 22, 2019 for Korean Application No. 10-2018-7012428, 22 pages.
Office Action mailed Jul. 23, 2019 for Japanese Application No. 2018-521928, 14 pages.
Office Action mailed Jul. 23, 2019 for Japanese Application No. 2018-522061, 9 pages.
Office Action mailed Feb. 25, 2020 for Japanese Application No. 2018-567854, 7 pages.
Office Action mailed Feb. 25, 2020 for Japanese Application No. 2018-567947, 6 pages.

(56) References Cited

OTHER PUBLICATIONS

Office Action mailed Feb. 25, 2020 for Japanese Appliication No. 2018-567856, 6 pages.
Office Action mailed Jun. 25, 2019 for Japanese Application No. 2018-519932, 5 pages.
Office Action mailed Sep. 26, 2019 for Korean Application No. 10-2018-7012353, 15 pages.
Office Action mailed Dec. 27, 2019 for Chinese Application No. 201680049091, 25 pages.
Office Action mailed Mar. 28, 2019 for Canadian Application No. 3003520, 3 pages.
Office Action mailed Mar. 29, 2019 for Korean Application No. 10-2018-7012366, 6 pages.
Office Action mailed Oct. 29, 2018 for Russian Application No. 2018115542, 9 pages.
Office Action mailed Feb. 4, 2020 for Japanese Application No. 2018-507621, 29 pages.
Office Action mailed Feb. 7, 2019 for Korean Application No. 10-2018-7006076, 10 pages.
Office Action mailed May 7, 2019 for Japanese Application No. 2018-507621, 8 pages.
Office Action mailed Dec. 9, 2019 for Canadian Application No. 3003521, 6 pages.
Todaka T., et al., "Low Curie Temperature Material for Induction Heating Self-Temperature Controlling System," Journal of Magnetism and Magnetic Materials, vol. 320 (20), Oct. 2008, pp. e702-e707.
Koran Office Action Application No. 10-2018-7037677, dated May 12, 2021, 4 pages.
Office Action for Brazilian Application No. 112018077348-4, mailed on Sep. 27, 2021, 4 pages.
Office Action for Chinese Application No. 201780040300.4, mailed on Apr. 26, 2022, 9 pages.
Office Action for Chinese Application No. 201780040300.4, mailed on Nov. 15, 2021, 14 pages.
Office Action for Japanese Application No. 2020-182750, mailed on Oct. 12, 2021, 8 pages.
Office Action for Korean Application No. 10-2021-7018056, mailed on Oct. 27, 2021, 21 pages.
Office Action for Malaysian Application No. PI2018002742, dated Apr. 21, 2021, 4 pages.
Office Action for Russian Application No. 2020135851, mailed on May 24, 2021, 13 pages.
Office Action for Ukraine Application No. a201813017, mailed May 6, 2022, 3 pages.
International Search Report and Written Opinion, Application No. PCT/EP2017/065908, filed Oct. 17, 2017, 15 pages.
"Chinese Office Action, Application No. 201680049091.5, mailed Aug. 14, 2020",.
"Communication pursuant to Article 94(3) EPC for Application No. 16798648.8, mailed on Nov. 19, 2020",.
"Communication pursuant to Article 94(3) EPC for Application No. 17740628.7 mailed on May 9, 2022".
"Communication pursuant to Article 94(3) EPC for Application No. 17740631.1 mailed on Oct. 18, 2022",.
"Decision of Refusal received for Japanese Patent Application No. 2020-191838, mailed on Feb. 28, 2023",.
"Decision to Grant a Patent mailed Mar. 15, 2022 for Japanese Application No. 2020-183062".
"European Office Action for Application No. 21213373.0, mailed on May 9, 2022".
"European Search Report for Application No. 21213373.0, mailed on Apr. 26, 2022",.
"European Search Report for European Application No. 20205063.9, mailed on Feb. 18, 2021",.
"Extended European Search Report for Application No. 20202666.2, mailed on Feb. 19, 2021",.
"Extended European Search Report for Application No. 20204770.0, mailed on Jun. 30, 2021",.
"Extended European Search Report for Application No. 20205060.5, mailed on Mar. 2, 2021".
"Extended European Search Report for Application No. 20205060.5, mailed on Aug. 6, 2021",.
"Extended European Search Report for Application No. 20205065.4, mailed on Mar. 10, 2021",.
"Extended European Search Report for Application No. EP20205306.2, mailed on Feb. 19, 2021",.
"Extended Search Report received for European Patent Application No. 22166210.9, mailed on Oct. 31, 2022".
"International Preliminary Report on Patentability for Application No. PCT/EP2016/075736, mailed on May 11, 2018",.
"International Preliminary Report on Patentability received for PCT Patent Application No. PCT/EP2016/070190, mailed on Mar. 15, 2018",.
"International Preliminary Report on Patentability received for PCT Patent Application No. PCT/EP2018/083795, mailed on Jun. 18, 2020",.
"International Preliminary Report on Patentability received for PCT Patent Application No. PCT/EP2021/075735, mailed on Apr. 13, 2023",.
"International Search Report and Written Opinion received for PCT Patent Application No. PCT/EP2018/058195, mailed on Nov. 12, 2018",.
"International Search Report and Written Opinion received for PCT Patent Application No. PCT/EP2021/075735, mailed on Jan. 5, 2022",.
"International Search Report for Application No. PCT/EP2018/083795, mailed Mar. 15, 2019",.
"Notice of Opposition mailed Jun. 3, 2020 for European Application No. 16766494.5",.
"Notice of Reason for Refusal received for Japanese Patent Application No. 2022-160803, mailed on Nov. 14, 2023",.
"Notice of Reasons for Refusal received for Japanese Patent Application No. 2022-011143, mailed on Mar. 28, 2023",.
"Notice of Reasons for Refusal received for Japanese Patent Application No. 2022-048457, mailed on Jan. 31, 2023",.
"Notice of Reasons for Rejection for Japanese Application No. 2022-139703, mailed on Jul. 25, 2023".
"Notice of Reasons for Rejection received for Japanese Patent Application No. 2020-528003, mailed on Jul. 20, 2021".
"Notice of Reasons of Refusal received for Japanese Patent Application No. 2020-191838, mailed on Jul. 5, 2022",.
"Notification of Reason for Refusal mailed Jan. 3, 2022 for Korean Application No. 10- 2020-7018918".
"Office Action and Search Report for Chinese Application No. 201880059756, mailed Jan. 14, 2022",.
"Office Action and Search Report for Russian Application No. 2020134245, mailed on Jan. 19, 2022",.
"Office Action and Search Report mailed Jan. 18, 2022 for Russian Application No. 2020134241".
"Office Action dated Jun. 1, 2021, for Russian Application No. 2020135859",.
"Office Action dated Jun. 17, 2021 for Ukraine Application No. a201804590",.
"Office action for Brazilian Application No. 112020005010-5, mailed on Jul. 21, 2022",.
"Office Action For Canadian Application No. 3,003,519, mailed on Jul. 30, 2021",.
"Office Action For Canadian Application No. 3,056,677, mailed on Nov. 24, 2020",.
"Office Action For Chinese Application No. 201680072882.X, mailed on Jan. 14, 2021",.
"Office Action For Chinese Application No. 201680072882.X, mailed on Sep. 1, 2021",.
"Office Action for Chinese Application No. 201880059756.X, mailed Sep. 23, 2022",.
"Office Action For Japanese Application No. 2020-093539, mailed on Apr. 6, 2021",.
"Office Action For Japanese Application No. 2020-175420, mailed on Oct. 12, 2021",.
"Office Action For Japanese Application No. 2020-182740, mailed on Oct. 12, 2021",.

(56) References Cited

OTHER PUBLICATIONS

"Office Action For Japanese Application No. 2020-183062, mailed on Nov. 30, 2021",.
"Office Action For Japanese Application No. 2020-191836, mailed on Oct. 26, 2021",.
"Office Action For Japanese Application No. 2020-191838, mailed on Oct. 26, 2021",.
"Office Action for Japanese Application No. 2022-010005, mailed on Mar. 15, 2022",.
"Office Action For Korean Application No. 10-2018-7037677, mailed on Mar. 29, 2021",.
"Office action for Korean Application No. 10-2020-7007392, mailed Sep. 26, 2022",.
"Office Action for Korean Application No. 10-2020-7011369, mailed May 10, 2022",.
"Office action for Korean Application No. 10-2020-7018918, mailed on Jul. 27, 2022",.
"Office Action For Korean Application No. 10-2021-7023346, mailed on Dec. 14, 2021",.
"Office Action For Russian Application No. 2020135808, mailed on Apr. 23, 2021",.
"Office Action mailed May 12, 2021 for Chinese Application No. 201780040874.1",.
"Office Action mailed May 12, 2021 for Korean Application No. 10-2018-7037693".
"Office Action mailed Feb. 16, 2021 for Japanese Application No. 2018-567856",.
"Office Action mailed Mar. 2, 2021 for Japanese Application No. 2018-567947",.
"Office Action mailed Jun. 22, 2022 for Russian Application No. 2019107295",.
"Office Action mailed Apr. 29, 2021, for Malaysian Application No. PI2018701525",.
"Office Action received for Australian Patent Application No. 2022200981, mailed on Dec. 15, 2022",.
"Office Action received for Brazilian Patent Application No. 112018077348-4, mailed on Oct. 25, 2022",.
"Office Action received for Brazilian Patent Application No. 112018077348-4, mailed on Sep. 2, 2022",.
"Office Action received for Brazilian Patent Application No. 122022011678-7, mailed on Feb. 27, 2023",.
"Office Action received for Canadian Patent Application No. 3,171,963, mailed on Nov. 22, 2023",.
"Office Action received for European Patent Application No. 16798649.6, mailed on Jan. 3, 2022",.
"Office Action received for European Patent Application No. 16798649.6, mailed on Jul. 5, 2021",.
"Office Action received for European Patent Application No. 16798649.6, mailed on May 25, 2022",.
"Office Action received for European Patent Application No. 16798650.4, mailed on Mar. 6, 2020".
"Office Action received for European Patent Application No. 20202666.2, mailed on Jul. 6, 2023",.
"Office Action received for European Patent Application No. 20205060.5, mailed on Jul. 28, 2023",.
"Office Action received for Korean Patent Application No. 10-2020-7018748, mailed on Jun. 28, 2023".
"Office Action received for Korean Patent Application No. 10-2022-7025860, mailed on Feb. 15, 2023",.
"Reason for Rejection received for Korean Patent Application No. 10-2022-7025860, mailed on Aug. 11, 2023",.
"Reasons for Refusal received for Japanese Patent Application No. 2022-111113, mailed on Aug. 29, 2023",.
"Reasons for Rejection received for Korean Patent Application No. 10-2021-7016788, mailed on Dec. 1, 2023".
"Result of Consultation received for European Patent Application No. 16798650.4, mailed on Feb. 8, 2022",.
Aoun, Abi , "Application and File History for U.S. Patent Application No. 15/733, 194, filed Jun. 8, 2020", , (Copy Not Attached).
Blandino , et al. , "Application and File History for U.S. Appl. No. 14/927,532, filed Oct. 30, 2015".
Blandino , et al. , "Application and File History for U.S. Appl. No. 14/927,539, filed Oct. 30, 2015",.
Blandino , et al. , "Application and File History for U.S. Appl. No. 14/927,551, filed Oct. 30, 2015",.
Blandino , et al. , "Application and File History for U.S. Appl. No. 14/927,556, filed Oct. 30, 2015.",.
Blandino , et al. , "Application and File History for U.S. Appl. No. 16/946,043, filed Jun. 3, 2020",.
Blandino, Thomas P. , "Application and File History for U.S. Patent Application No. U.S. Appl. No. 15/754,834, filed Feb. 23, 2018", , (Copy Not Attached).
Blandino, Thomas P. , "Application and File History for U.S. Appl. No. 15/772,396, filed Apr. 30, 2018", , (Copy Not Attached).
Kaufman , et al. , "Application and File History for U.S. Appl. No. 14/840,897, filed Aug. 31, 2015",.
Kaufman , et al. , "Application and File History for U.S. Appl. No. 14/927,529, filed Oct. 30, 2015",.
Kaufman , et al. , "Application and File History for U.S. Appl. No. 14/927,537, filed Oct. 30, 2015",.
Kaufman , et al. , "Application and File History for U.S. Appl. No. 16/947,215, filed Jul. 23, 2020",.

* cited by examiner

APPARATUS FOR HEATING SMOKABLE MATERIAL

PRIORITY CLAIM

The present application is a National Phase entry of PCT Application No. PCT/EP2017/065908, filed Jun. 27, 2017, which claims priority from Provisional Application No. 62/356,334, filed Jun. 29, 2016, each of which is hereby fully incorporated herein by reference.

TECHNICAL FIELD

The present disclosure relates to an apparatus for heating smokable material to volatilize at least one component of the smokable material, to heating elements for use with such an apparatus, to articles for use with such an apparatus, to systems comprising such an apparatus and such articles, and to methods of heating smokable material to volatilize at least one component of the smokable material.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called “heat not burn” products or tobacco heating devices or products, which release compounds by heating, but not burning, material. The material may be, for example, tobacco or other non-tobacco products, which may or may not contain nicotine.

SUMMARY

A first aspect of the present disclosure provides a heating element for use with an apparatus for heating smokable material to volatilize at least one component of the smokable material, the heating element formed from heating material that is heatable by penetration with a varying magnetic field, wherein first and second portions of the heating element have different respective thermal masses.

In an exemplary embodiment, the thermal mass of the heating element varies with distance along the heating element.

In an exemplary embodiment, the thermal mass of the heating element varies over at least a majority of a length of the heating element.

In an exemplary embodiment, the thermal mass of the heating element reduces continuously with distance along the heating element.

In an exemplary embodiment, the thermal mass of the heating element reduces linearly with distance along the heating element.

In an exemplary embodiment, the first and second portions of the heating element have different respective thermal masses as a result of a density of the first portion of the heating element being different to a density of the second portion of the heating element.

In an exemplary embodiment, the first and second portions of the heating element have different respective thermal masses as a result of a thickness of the first portion of the heating element being different to a thickness of the second portion of the heating element.

In an exemplary embodiment, the first and second portions of the heating element have different respective thermal masses as a result of a material composition of the first portion of the heating element being different to a material composition of the second portion of the heating element.

In an exemplary embodiment, a material composition of the heating material of the first portion of the heating element is the same as a material composition of the heating material of the second portion of the heating element.

In an exemplary embodiment, a material composition of the heating material is homogenous throughout the heating element.

In an exemplary embodiment, a density of the first portion of the heating element is the same as a density of the second portion of the heating element.

In an exemplary embodiment, a density of the heating element is homogenous throughout the heating element.

In an exemplary embodiment, a cross-section of the first portion of the heating element is the same in both shape and dimensions as a cross-section of the second portion of the heating element.

In an exemplary embodiment, the heating material comprises one or more materials selected from the group consisting of: an electrically-conductive material, a magnetic material, and a magnetic electrically-conductive material.

In an exemplary embodiment, the heating material comprises a metal or a metal alloy.

In an exemplary embodiment, the heating material comprises one or more materials selected from the group consisting of: aluminum, gold, iron, nickel, cobalt, conductive carbon, graphite, plain-carbon steel, stainless steel, ferritic stainless steel, copper, and bronze.

A second aspect of the present disclosure provides an article for use with an apparatus for heating smokable material to volatilize at least one component of the smokable material, the article comprising a heating element formed from heating material that is heatable by penetration with a varying magnetic field, and smokable material in thermal contact in use with the heating element, wherein first and second portions of the heating element have different respective thermal masses.

In an exemplary embodiment, the smokable material is in surface contact with the heating element.

In an exemplary embodiment, the smokable material comprises tobacco and/or one or more humectants.

In an exemplary embodiment, the smokable material is non-liquid.

In an exemplary embodiment, the heating element of the article of the second aspect is the heating element of the first aspect. The heating element of the article of the second aspect may have any one or more of the features discussed above as being present in respective exemplary embodiments of the heating element of the first aspect.

A third aspect of the present disclosure provides an apparatus for heating smokable material to volatilize at least one component of the smokable material, the apparatus comprising: a magnetic field generator for generating a varying magnetic field; and a heating element formed from heating material that is heatable by penetration with the varying magnetic field, wherein first and second portions of the heating element have different respective thermal masses.

In an exemplary embodiment, the apparatus comprises a heating zone for receiving at least a portion of an article comprising smokable material, and the heating element projects into the heating zone.

In an exemplary embodiment, the apparatus comprises a heating zone for receiving at least a portion of an article comprising smokable material, and the heating element extends at least partially around the heating zone.

In an exemplary embodiment, the apparatus is for heating smokable material to volatilize at least one component of the smokable material without combusting the smokable material.

In an exemplary embodiment, the heating element of the apparatus of the third aspect is the heating element of the first aspect. The heating element of the apparatus of the third aspect may have any one or more of the features discussed above as being present in respective exemplary embodiments of the heating element of the first aspect.

A fourth aspect of the present disclosure provides a system for heating smokable material to volatilize at least one component of the smokable material, the system comprising: an article comprising smokable material; apparatus comprising a heating zone for receiving at least a portion of the article, and a magnetic field generator for generating a varying magnetic field to be used in heating the smokable material when the portion of the article is in the heating zone; and a heating element formed from heating material that is heatable by penetration with the varying magnetic field when the portion of the article is in the heating zone, wherein first and second portions of the heating element have different respective thermal masses.

In an exemplary embodiment, the apparatus of the system of the fourth aspect is the apparatus of the third aspect. The apparatus of the system of the fourth aspect may have any one or more of the features discussed above as being present in respective exemplary embodiments of the apparatus of the third aspect.

A fifth aspect of the present disclosure provides a method of heating smokable material to volatilize at least one component of the smokable material, the method comprising: providing a heating element formed from heating material that is heatable by penetration with a varying magnetic field, wherein first and second portions of the heating element have different respective thermal masses; providing smokable material in thermal contact with the heating element; and penetrating the heating material with a varying magnetic field so that the penetrating causes progressive heating of the heating element and thereby progressive heating of the smokable material.

In an exemplary embodiment, the heating element is the heating element of the first aspect. The heating element may have any one or more of the features discussed above as being present in respective exemplary embodiments of the heating element of the first aspect.

BRIEF DESCRIPTION OF THE DRAWINGS

Embodiments of the disclosure will now be described, by way of example only, with reference to the accompanying drawings, in which.

DETAILED DESCRIPTION

Figure 1:
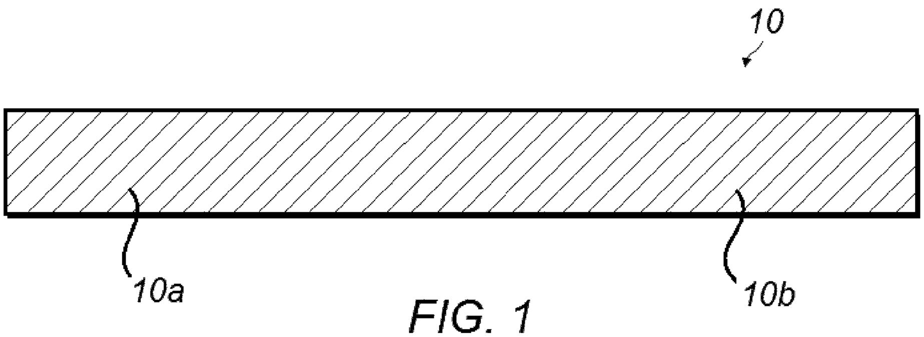
FIG. 1 shows a schematic cross-sectional view of an example of a heating element for use with an apparatus for heating smokable material to volatilize at least one component of the smokable material.

As used herein, the term "smokable material" includes materials that provide volatilized components upon heating, typically in the form of vapor or an aerosol. "Smokable material" may be a non-tobacco-containing material or a tobacco-containing material. "Smokable material" may, for example, include one or more of tobacco per se, tobacco derivatives, expanded tobacco, reconstituted tobacco, tobacco extract, homogenized tobacco or tobacco substitutes. The smokable material can be in the form of ground tobacco, cut rag tobacco, extruded tobacco, reconstituted tobacco, reconstituted smokable material, liquid, gel, gelled sheet, powder, or agglomerates, or the like. "Smokable material" also may include other, non-tobacco, products, which, depending on the product, may or may not contain nicotine. "Smokable material" may comprise one or more humectants, such as glycerol or propylene glycol.

As used herein, the term "heating material" or "heater material" refers to material that is heatable by penetration with a varying magnetic field.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

It has been found that, when the susceptor is in the form of a closed circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Referring to FIG. 1 there is shown a schematic perspective view of an example of a heating element according to an embodiment of the disclosure. The heating element 10 is for use with an apparatus for heating smokable material to volatilize at least one component of the smokable material.

The heating element 10 is formed from heating material that is heatable by penetration with a varying magnetic field. Examples of such materials are discussed below.

The heating element 10 of this embodiment is elongate with a length that extends from a first end of the heating element 10 to an opposite second end of the heating element 10. Moreover, the heating element 10 has a cross-section perpendicular to the length, wherein the cross-section has a width and a depth. In this embodiment, the length is greater than the width, and the width is greater than the depth.

In this embodiment, the heating element 10 has a rectangular cross-section perpendicular to its length. The depth or thickness of the heating element 10 is relatively small as compared to the other dimensions of the heating element 10. Therefore, a greater proportion of the heating element 10 may be heatable by a given varying magnetic field, as compared to a heating element 10 having a depth or thickness that is relatively large as compared to the other dimensions of the heating element 10. Thus, a more efficient use of material is achieved. In turn, costs are reduced. However, in other embodiments, the heating element 10 may have a cross-section that is a shape other than rectangular, such as circular, elliptical, annular, star-shaped, polygonal, square, triangular, X-shaped, or T-shaped. In this embodiment, a cross-section of the first portion 10*a* of the heating element 10 is the same in both shape and dimensions as a cross-section of the second portion 10*b* of the heating element 10. Moreover, in this embodiment, the cross-section of the heating element 10 is constant in both shape and dimensions along the length of the heating element 10. Furthermore, in this embodiment, the heating element 10 is planar, or substantially planar. The heating element 10 of this embodiment can be considered a flat strip. However, in other embodiments, this may not be the case. For example, in some embodiments, the heating element may be non-planar, such as twisted, corrugated, having at least one curved major surface. In some embodiments, the heating element may be hollow or perforated.

The thermal mass of a body is proportional to the mass (weight) of the body multiplied by its heat capacity (the ability of the body to store thermal energy). Different portions of a body can have different thermal masses only if the weight or densities are different, and/or if their heat capacities are different.

First and second portions 10*a*, 10*b* of the heating element 10 have different respective thermal masses. This enables the first and second portions 10*a*, 10*b* of the heating element 10 to heat at different respective rates, when the first and second portions 10*a*, 10*b* of the heating element 10 are penetrated with a varying magnetic field. That is, the first portion 10*a* of the heating element 10 is heatable at a first rate when penetrated with a varying magnetic field, and the second portion 10*b* of the heating element 10 is heatable at a second rate when penetrated with the varying magnetic field, and the first rate differs from the second rate. This means that the heating element 10 is progressively heatable by penetration with a given varying magnetic field, and so the heating element 10 is usable to progressively heat its surroundings.

In this embodiment, the first and second portions 10*a*, 10*b* of the heating element 10 have different respective thermal masses as a result of a density of the first portion 10*a* of the heating element 10 being different to a density of the second portion 10*b* of the heating element 10. In this embodiment, the first portion 10*a* of the heating element 10 has a greater density, and therefore a greater thermal mass, than the second portion 10*b* of the heating element 10. For example, the first portion 10*a* of the heating element 10 may be made from a first material, and the second portion 10*b* of the heating element 10 may be made from a second material that is different from the first material and less dense than the first material. Alternatively or additionally, the first and second portions 10*a*, 10*b* of the heating element 10 may contain respective different levels or amounts of a non-permeable additive. The second portion 10*b* of the heating element 10 is therefore heatable by penetration with a given varying magnetic field at a greater rate than the first portion 10*a* of the heating element 10.

In this embodiment, the first and second portions 10*a*, 10*b* of the heating element 10 are at opposite ends of the heating element 10. However, in other embodiments, one of the first and second portions 10*a*, 10*b* of the heating element 10 may be located between two of the other of the first and second portions 10*a*, 10*b* of the heating element 10. That is, in some embodiments, the heating element 10 may have a relatively denser portion between two relatively less dense portions, or may have a relatively less dense portion between two relatively denser portions.

In this embodiment, the thermal mass of the heating element 10 varies with distance along the length of the heating element 10. This is as a result of the density of the heating element 10 correspondingly varying with distance along the length of the heating element 10. Accordingly, during use, the heating element 10 heats progressively along its length. In other embodiments, the thermal mass of the heating element may vary with distance along a path other than a length of the heating element. For example, the thermal mass may vary with distance in a direction of the width or thickness of the heating element.

The thermal mass of the heating element 10 of FIG. 1 varies over the full length of the heating element 10, as a result of the density of the heating element 10 correspondingly varying over the full length of the heating element 10. In other embodiments, the thermal mass may vary over only a majority of the length of the heating element, or over only a portion of the length of the heating element. Again, this may be due to appropriate selection of changes in the density of the heating element along its length. The skilled person would readily be able to determine a distance over which they wish the thermal mass to vary, to provide a desired progressive heating profile in use. They would also be able to select an appropriate profile for how the density of the heating element varies along its length to provide that desired progressive heating profile.

In this embodiment, the thermal mass reduces continuously with distance along the length of the heating element 10 from the first portion 10*a* of the heating element 10 to the second portion 10*b* of the heating element 10. More specifically, in this embodiment, the thermal mass reduces linearly, or substantially linearly, with distance along the length. This is due to the density of the heating element 10 reducing linearly, or substantially linearly, with distance along the length of the heating element 10. Accordingly, in use the heating element 10 is progressively heatable at a constant, or substantially constant, rate along its length. However, in other embodiments, the thermal mass may vary other than continuously with distance along the length of the heating element 10 from the first portion 10*a* of the heating element 10 to the second portion 10*b* of the heating element 10. For example, the variation may be stepwise, or continuous over at least one section and stepwise over at least one other section. The skilled person would readily be able to determine a manner in which they wish the thermal mass to vary, to provide a desired progressive heating profile in use. They would also be able to select an appropriate profile for how the density of the heating element varies along its length to provide that desired progressive heating profile.

The heating element 10 of FIG. 1 may be incorporated into an apparatus for heating smokable material to volatilize at least one component of the smokable material, or may be incorporated into an article comprising smokable material and for use with such an apparatus. An example of such an article is discussed below with reference to FIG. 3.

Figure 2:
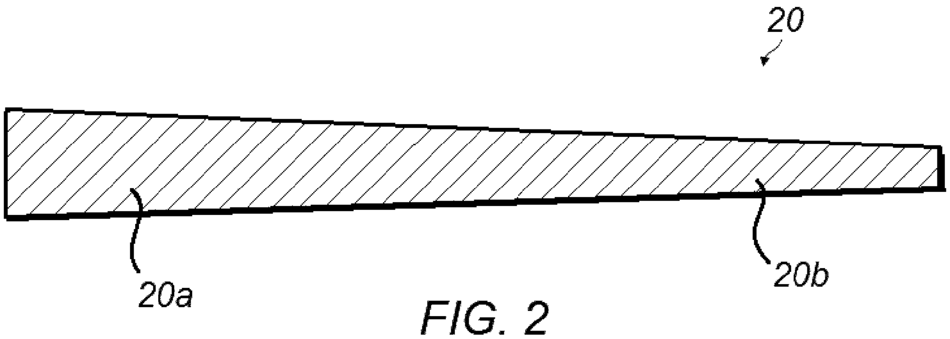
FIG. 2 shows a schematic cross-sectional view of an example of another heating element for use with an apparatus for heating smokable material to volatilize at least one component of the smokable material.

Referring to FIG. 2 there is shown a schematic cross-sectional view of an example of another heating element according to an embodiment of the disclosure. The heating element 20 is for use with an apparatus for heating smokable material to volatilize at least one component of the smokable material.

The heating element 20 is again formed from heating material that is heatable by penetration with a varying magnetic field, and again has first and second portions 20*a*, 20*b* that have different respective thermal masses. In this embodiment, however, the material composition of the heating material, including the density of the heating material, of the first portion 20*a* of the heating element 20 is the same as the material composition of the heating material of the second portion 20*b* of the heating element 20. In fact, in this embodiment, the material composition of the heating material, including the density of the heating material, is homogenous throughout the heating element 20. The first and second portions 20*a*, 20*b* of the heating element 20 have different respective thermal masses as a result of a thickness of the first portion 20*a* of the heating element 20 being different to a thickness of the second portion 20*b* of the heating element 20.

More specifically, the heating element 20 of this embodiment is elongate with a length that extends from a first end of the heating element 20 to an opposite second end of the heating element 20. The heating element 20 has a cross-section perpendicular to the length, wherein the cross-section has a width and a depth. The depth is the thickness of the heating element 20. In this embodiment, the length is greater than the width, and the width is greater than the depth. Moreover, in this embodiment the width is constant along the length of the heating element 20, but the depth is different at different respective points along the length.

In this embodiment, the heating element 10 has a rectangular cross-section perpendicular to its length. However, in other embodiments, the heating element 10 may have a cross-section that is a shape other than rectangular, such as one of the alternative shapes discussed above with reference to the embodiment of FIG. 1.

The heating element 20 of this embodiment has planar, or substantially planar, major surfaces. However, in other embodiments, this may not be the case. For example, in some embodiments, the heating element may be twisted, corrugated, or have at least one curved major surface. In some embodiments, the heating element may be hollow or perforated.

In this embodiment, the first and second portions 20*a*, 20*b* of the heating element 20 are at opposite ends of the heating element 20. However, in other embodiments, one of the first and second portions 20*a*, 20*b* of the heating element 20 may be located between two of the other of the first and second portions 20*a*, 20*b* of the heating element 20. That is, in some embodiments, the heating element 20 may have a relatively thick portion between two relatively thin portions, or may have a relatively thin portion between two relatively thick portions.

In this embodiment, the first portion 20*a* of the heating element 20 has a greater thickness, and therefore a greater thermal mass, than the second portion 20*b* of the heating element 20. The second portion 20*b* of the heating element 20 is therefore heatable by penetration with a given varying magnetic field at a greater rate than the first portion 20*a* of the heating element 20.

In this embodiment, the thermal mass of the heating element 20 varies with distance along the length of the heating element 20. This is as a result of the thickness of the heating element 20 correspondingly varying with distance along the length of the heating element 20. Accordingly, during use, the heating element 20 heats progressively along its length. In other embodiments, the thermal mass of the heating element may vary with distance along a path other than a length of the heating element. For example, the thermal mass may vary with distance in a direction of the width of the heating element.

The thermal mass of the heating element 20 of FIG. 2 varies over the full length of the heating element 20, as a result of the thickness of the heating element 20 correspondingly varying over the full length of the heating element 20. In other embodiments, the thermal mass may vary over only a majority of the length of the heating element, or over only a portion of the length of the heating element. Again, this may be due to appropriate selection of changes in the thickness of the heating element along its length. The skilled person would readily be able to determine a distance over which they wish the thermal mass to vary, to provide a desired progressive heating profile in use. They would also be able to select an appropriate profile for how the thickness of the heating element varies along its length to provide that desired progressive heating profile.

In this embodiment, the thermal mass reduces continuously with distance along the length of the heating element 20 from the first portion 20*a* of the heating element 20 to the second portion 20*b* of the heating element 20. More specifically, in this embodiment, the thermal mass reduces linearly, or substantially linearly, with distance along the length. This is due to the thickness of the heating element 20 reducing linearly, or substantially linearly, with distance along the length of the heating element 20. In other words, the heating element 20 is linearly tapered. Accordingly, in use the heating element 20 is progressively heatable at a constant, or substantially constant, rate along its length. However, in other embodiments, the thermal mass may vary other than continuously with distance along the length of the heating element 20 from the first portion 20*a* of the heating element 20 to the second portion 20*b* of the heating element 20. For example, the variation may be stepwise, or continuous over at least one section of the heating element 20 and stepwise over at least one other section of the heating element 20. The skilled person would readily be able to determine a manner in which they wish the thermal mass to vary, to provide a desired progressive heating profile in use. They would also be able to select an appropriate profile for how the thickness of the heating element varies along its length to provide that desired progressive heating profile.

The heating element 20 of FIG. 2 may be incorporated into an apparatus for heating smokable material to volatilize at least one component of the smokable material, or may be incorporated into an article comprising smokable material and for use with such apparatus. An example of such an article is discussed below with reference to FIG. 4, and an example of such an apparatus is discussed below with reference to FIG. 5.

It is to be noted that a tapered, or only partially tapered, heating element need not necessarily have a varying thermal mass along its length. For example, the density or material composition of such a heating element may also vary to offset the tapering, so that the thermal mass is constant along the length of the heating element. However, in some embodiments of the disclosure, the heating element is tapered and the material composition of the heating material, including the density of the heating material, is homogenous throughout the heating element, so that first and second portions of the heating element have different respective thermal masses.

In another embodiment, the first and second portions of the heating element may have different respective thermal masses as a result of a material composition of the first portion of the heating element being different to a material composition of the second portion of the heating element. For example, the first and second portions of the heating element may be made from different materials. For instance, one of the first and second portions of the heating element may be made from soft iron and the other from a stainless steel. Other materials that could be joined include steel, aluminum and iron. The first and second portions of the heating element may for example be joined by welding, brazing, thermal epoxy, a mechanical fastening, or the like. In some embodiments, the densities of the first and second portions of the heating element may differ through utilization of varying foamed material or a varying mesh material.

Figure 3:
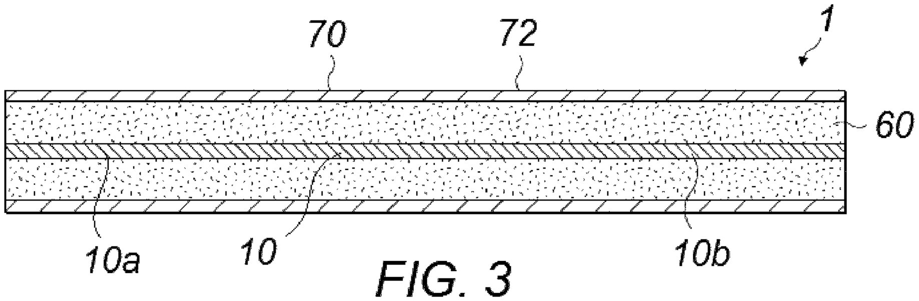
FIG. 3 shows a schematic cross-sectional view of an example of an article for use with an apparatus for heating smokable material to volatilize at least one component of the smokable material.
Figure 4:
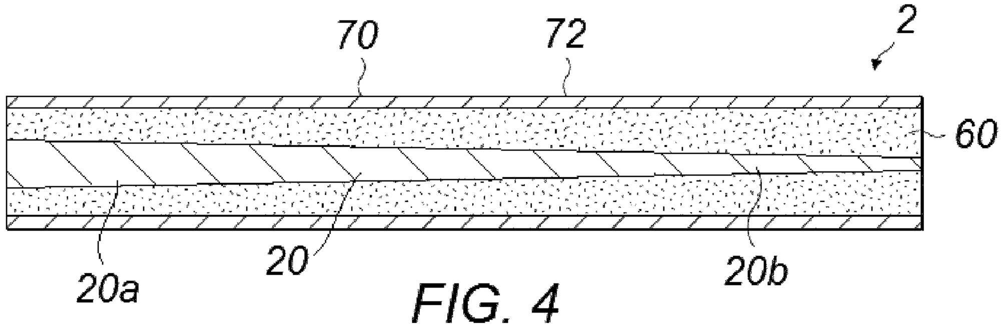
FIG. 4 shows a schematic cross-sectional view of an example of another article for use with an apparatus for heating smokable material to volatilize at least one component of the smokable material.

Referring to FIGS. 3 and 4 there are shown respective schematic cross-sectional views of examples of articles according to respective embodiments of the disclosure. Each of the articles 1, 2 is for use with apparatus for heating smokable material to volatilize at least one component of the smokable material.

The article 1 of FIG. 3 comprises the heating element 10 of FIG. 1, smokable material 60 in thermal contact with the heating element 10, and a cover 70 around the smokable material 60. The article 2 of FIG. 4 comprises the heating element 20 of FIG. 2, smokable material 60 in thermal contact with the heating element 20, and a cover 70 around the smokable material 60. Any of the herein-described possible variations to the heating element 10 of FIG. 1 may be made to the heating element 10 of the article 1 of FIG. 3 to form separate respective embodiments of articles. Similarly, any of the herein-described possible variations to the heating element 20 of FIG. 2 may be made to the heating element 20 of the article 2 of FIG. 4 to form separate respective embodiments of articles.

In each of the articles 1, 2, the cover 70 encircles the smokable material 60. The cover 70 helps to protect the smokable material 60 from damage during transport and use of the article 1, 2. During use, the cover 70 may also help to direct the flow of air into and through the smokable material 60, and may help to direct the flow of vapor or aerosol through and out of the smokable material 60.

In each of these embodiments, the cover 70 comprises a wrapper 72 that is wrapped around the smokable material 60 so that free ends of the wrapper 72 overlap each other. The wrapper 72 thus forms all of, or a majority of, a circumferential outer surface of the article 1, 2. The wrapper 72 may be formed from paper, reconstituted smokable material, such as reconstituted tobacco, or the like. The cover 70 of each of these embodiments also comprises an adhesive (not shown) that adheres the overlapped free ends of the wrapper 72 to each other. The adhesive may comprise one or more of, for example, gum Arabic, natural or synthetic resins, starches, and varnish. The adhesive helps prevent the overlapped free ends of the wrapper 72 from separating. In other embodiments, the adhesive may be omitted.

The cover 70 of each of these embodiments defines an outer surface of the article 1, 2 and may contact the apparatus in use. In each of these embodiments, the article 1, 2 is elongate and cylindrical with a substantially circular cross-section, and has proportions approximating those of a cigarette. However, in other embodiments, the article 1, 2 may have a cross-section other than circular and/or not be elongate and/or not be cylindrical.

In the embodiments of FIGS. 3 and 4, the smokable material 60 is in the form of a tube. The tube has a substantially circular cross-section. The smokable material 60 extends from one end of the article 1, 2 to an opposite end of the article 1, 2. Thus, in use, air may be drawn into the smokable material 60 at one end of the article 1, 2, the air may pass through the smokable material 60 and pick up volatilized components released from the smokable material 60, and then the volatilized components, typically in the form of vapor or an aerosol, may be drawn out of the smokable material 60 at the opposite end of the article 1, 2. In each of these embodiments in which the article 1, 2 is elongate, these ends of the article 1, 2 between which the smokable material 60 extends are opposite longitudinal ends of the article 1, 2. However, in other embodiments, the ends may be any two ends or sides of the article, such as any two opposite ends or sides of the article.

As noted above, in each of the articles 1, 2 of FIGS. 3 and 4, the heating element 10, 20 is in thermal contact with the smokable material 60. Therefore, the heating material is heatable in use to heat the smokable material 60. More specifically, in each of these embodiments, the smokable material 60 is in surface contact with the heating element 10, 20. This is achieved by adhering the smokable material 60 to the heating element 10, 20. However, in other embodiments, the fixing may be by other than adhesion. In some embodiments the smokable material 60 may not be fixed to the heating element 10, 20 as such.

In each of the embodiments of FIGS. 3 and 4, the heating element 10, 20 extends from one end of the smokable material 60 to an opposite end of the smokable material 60. This can help to provide more complete heating of the smokable material 60 in use. However, in other embodiments, the heating element 10, 20 may not extend to either of the opposite ends of the smokable material 60, or may extend to only one of the ends of the smokable material 60 and be spaced from the other of the ends of the smokable material 60.

Moreover, in each of the embodiments of FIGS. 3 and 4, the heating element 10, 20 extends from one end of the article 1, 2 to an opposite end of the article 1, 2. This can aid manufacturing of the article 1, 2. However, in other embodiments, the heating element 10, 20 may not extend to either of the opposite ends of the article 1, 2, or may extend to only one of the ends of the article 1, 2 and be spaced from the other of the ends of the article 1, 2.

The heating element 10, 20 of each of the embodiments of FIGS. 3 and 4 extends along a longitudinal axis that is substantially aligned with a longitudinal axis of the article 1, 2. This can aid manufacturing of the article 1, 2. In these embodiments, the aligned axes are coincident. In a variation to these embodiments, the aligned axes may be parallel to each other. However, in other embodiments, the axes may be oblique to each other.

In each of these embodiments, the heating element 10, 20 is encircled by the smokable material 60. That is, the smokable material 60 extends around the heating element 10, 20. In embodiments in which the heating element 10, 20 does not extend to either of the opposite ends of the smokable material 60, the smokable material 60 may extend around the heating element 10, 20 and also cover the ends of the heating element 10, 20, so that the heating element 10, 20 is surrounded by the smokable material 60.

In each of the illustrated embodiments, the heating element 10, 20 is impermeable to air or volatilized material, and is substantially free from discontinuities. The heating element 10, 20 may thus be relatively easy to manufacture. However, in variations to these embodiments, the heating element 10, 20 may be permeable to air and/or permeable to volatilized material created when the smokable material 60 is heated. Such a permeable nature of the heating element 10, 20 may help air passing through the article 1, 2 to pick up the volatilized material created when the smokable material 60 is heated.

As noted above, in some embodiments the heating element 10, 20 may be non-planar. For example, the heating element 10, 20 may follow a wavelike or wavy path, be twisted, be corrugated, be helical, have a spiral shape, comprise a plate or strip or ribbon having protrusions thereon and/or indentations therein, comprise a mesh, comprise expanded metal, or have a non-uniform non-planar shape. Such non-planar shapes may help air passing through the article 1, 2 to pick up the volatilized material created when the smokable material 60 is heated. Non-planar shapes can provide a tortuous path for air to follow, creating turbulence in the air and causing better heat transfer from the heating element 10, 20 to the smokable material 60. The non-planar shapes can also increase the surface area of the heating element 10, 20 per unit length of the heating element 10, 20. This can result in greater or improved Joule heating of the heating element 10, 20, and thus greater or improved heating of the smokable material 60.

Figure 5:
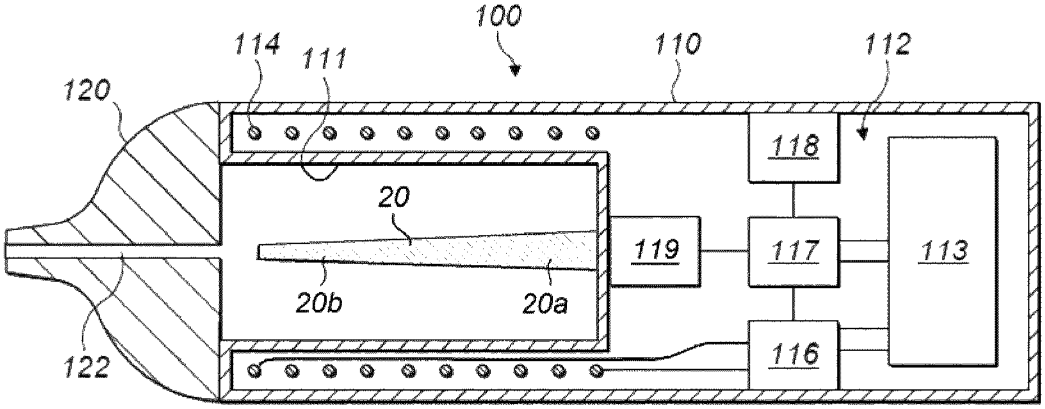
FIG. 5 shows a schematic cross-sectional view of an example of an apparatus for heating the smokable material to volatilize at least one component of the smokable material.

Referring to FIG. 5 there is shown a schematic perspective view of an example of an apparatus according to an embodiment of the disclosure. The apparatus 100 is for heating smokable material to volatilize at least one component of the smokable material. The apparatus 100 comprises a magnetic field generator 112 for generating a varying magnetic field in use, and a heating element 20 formed from heating material that is heatable by penetration with the varying magnetic field. First and second portions 20*a*, 20*b* of the heating element 20 have different respective thermal masses.

More specifically, the apparatus 100 of this embodiment comprises a body 110 and a mouthpiece 120. The mouthpiece 120 may be made of any suitable material, such as a plastics material, cardboard, cellulose acetate, paper, metal, glass, ceramic, or rubber. The mouthpiece 120 defines a channel 122 therethrough. The mouthpiece 120 is locatable relative to the body 110 so as to cover an opening into the heating zone 111. When the mouthpiece 120 is so located relative to the body 110, the channel 122 of the mouthpiece 120 is in fluid communication with the heating zone 111. In use, the channel 122 acts as a passageway for permitting volatilized material to pass from smokable material of an article inserted in the heating zone 111 to an exterior of the apparatus 100. In this embodiment, the mouthpiece 120 of the apparatus 100 is releasably engageable with the body 110 so as to connect the mouthpiece 120 to the body 110. In other embodiments, the mouthpiece 120 and the body 110 may be permanently connected, such as through a hinge or flexible member. In some embodiments, such as embodiments in which the article itself comprises a mouthpiece, the mouthpiece 120 of the apparatus 100 may be omitted.

The apparatus 100 may define an air inlet that fluidly connects the heating zone 111 with the exterior of the apparatus 100. Such an air inlet may be defined by the body 110 of the apparatus 100 and/or by the mouthpiece 120 of the apparatus 100. A user may be able to inhale the volatilized component(s) of the smokable material by drawing the volatilized component(s) through the channel 122 of the mouthpiece 120. As the volatilized component(s) are removed from the article, air may be drawn into the heating zone 111 via the air inlet of the apparatus 100.

In this embodiment, the body 110 comprises the heating zone 111. In this embodiment, the heating zone 111 comprises a recess 111 for receiving at least a portion of the article. In other embodiments, the heating zone 111 may be other than a recess, such as a shelf, a surface, or a projection, and may require mechanical mating with the article in order to co-operate with, or receive, the article. In this embodiment, the heating zone 111 is elongate, and is sized and shaped to accommodate the whole article. In other embodiments, the heating zone 111 may be dimensioned to receive only a portion of the article.

In this embodiment, the magnetic field generator 112 comprises an electrical power source 113, a coil 114, a device 116 for passing a varying electrical current, such as an alternating current, through the coil 114, a controller 117, and a user interface 118 for user-operation of the controller 117.

The electrical power source 113 of this embodiment is a rechargeable battery. In other embodiments, the electrical power source 113 may be other than a rechargeable battery, such as a non-rechargeable battery, a capacitor, a battery-capacitor hybrid, or a connection to a mains electricity supply.

The coil 114 may take any suitable form. In this embodiment, the coil 114 is a helical coil of electrically-conductive material, such as copper. In some embodiments, the magnetic field generator 112 may comprise a magnetically permeable core around which the coil 114 is wound. Such a magnetically permeable core concentrates the magnetic flux produced by the coil 114 in use and makes a more powerful magnetic field. The magnetically permeable core may be made of iron, for example. In some embodiments, the magnetically permeable core may extend only partially along the length of the coil 114, so as to concentrate the magnetic flux only in certain regions. In some embodiments, the coil may be a flat coil. That is, the coil may be a two-dimensional spiral.

It will be understood from consideration of FIG. 5 that in this embodiment the heating element 20 projects into the heating zone 111. The heating element 20 has a length from a first end at which the heating element 20 is mounted to the rest of the body 110 to a free second end. The free end is arranged relative to the heating zone 111 so as to enter the article as the article is inserted into the heating zone 111. The tapered shape of the heating element 20 may facilitate this entry.

When the article is located in the heating zone 111, the heating element 20 is in thermal contact with the smokable material of the article. In some embodiments, when the article is located in the heating zone 111, the heating element 20 is in surface contact with the smokable material of the article. Thus, heat may be conducted directly from the heating element 20 to the smokable material. In other embodiments, the heating element 20 may be kept out of surface contact with the smokable material. For example, in some embodiments, the article and/or apparatus 100 may comprise a thermally-conductive barrier that is free from heating material and that spaces the heating element 20 from the smokable material of the article in use. In some embodiments, the thermally-conductive barrier may be a coating on the heating element 20. The provision of such a barrier may be advantageous to help to dissipate heat to alleviate hot spots in the heating element 20, or to aid cleaning of the heating element 20.

The heating element 20 of the apparatus 10 is the same as the heating element 20 of FIG. 2. The first and second portions 20*a*, 20*b* of the heating element 20 of FIG. 5 correspond respectively to the first and second portions 20*a*, 20*b* of the heating element 20 of FIG. 2. Therefore, in the interest of conciseness, features common to the two heating elements 20 will not be described again in detail. Any of the herein-described possible variations to the heating element 20 of FIG. 2 may be made to the heating element 20 of the apparatus 100 of FIG. 5 to form separate respective embodiments of the apparatus.

In this embodiment, the coil 114 encircles the heating element 20 and the heating zone 111. The coil 114 extends along a longitudinal axis that is substantially aligned with a longitudinal axis of the heating zone 111. The aligned axes are coincident. In a variation to this embodiment, the aligned axes may be parallel to each other. However, in other embodiments, the axes may be oblique to each other. Moreover, the coil 114 extends along a longitudinal axis that is substantially coincident with a longitudinal axis of the heating element 20. In other embodiments, the longitudinal axes of the coil 114 and the heating element 20 may be aligned with each other by being parallel to each other, or may be oblique to each other.

In this embodiment, the device 116 for passing a varying current through the coil 114 is electrically connected between the electrical power source 113 and the coil 114. In this embodiment, the controller 117 also is electrically connected to the electrical power source 113, and is communicatively connected to the device 116 to control the device 116. More specifically, in this embodiment, the controller 117 is for controlling the device 116, so as to control the supply of electrical power from the electrical power source 113 to the coil 114. In this embodiment, the controller 117 comprises an integrated circuit (IC), such as an IC on a printed circuit board (PCB). In other embodiments, the controller 117 may take a different form. In some embodiments, the apparatus may have a single electrical or electronic component comprising the device 116 and the controller 117. The controller 117 is operated in this embodiment by user-operation of the user interface 118. In this embodiment, the user interface 118 is located at the exterior of the body 110. The user interface 118 may comprise a push-button, a toggle switch, a dial, a touchscreen, or the like. In other embodiments, the user interface 118 may be remote and connected to the rest of the apparatus wirelessly, such as via Bluetooth.

In this embodiment, operation of the user interface 118 by a user causes the controller 117 to cause the device 116 to cause an alternating electrical current to pass through the coil 114. This causes the coil 114 to generate an alternating magnetic field. The coil 114 and the heating element 20 of the apparatus 100 are suitably relatively positioned so that the varying magnetic field produced by the coil 114 penetrates the heating material of the heating element 20. In this embodiment, the heating material of the heating element 20 is an electrically-conductive material, and so this penetration causes the generation of one or more eddy currents in the heating material. The flow of eddy currents in the heating material against the electrical resistance of the heating material causes the heating material to be heated by Joule heating. When the heating material is made of a magnetic material, the orientation of magnetic dipoles in the heating material changes with the changing applied magnetic field, which causes heat to be generated in the heating material.

Figure 7:
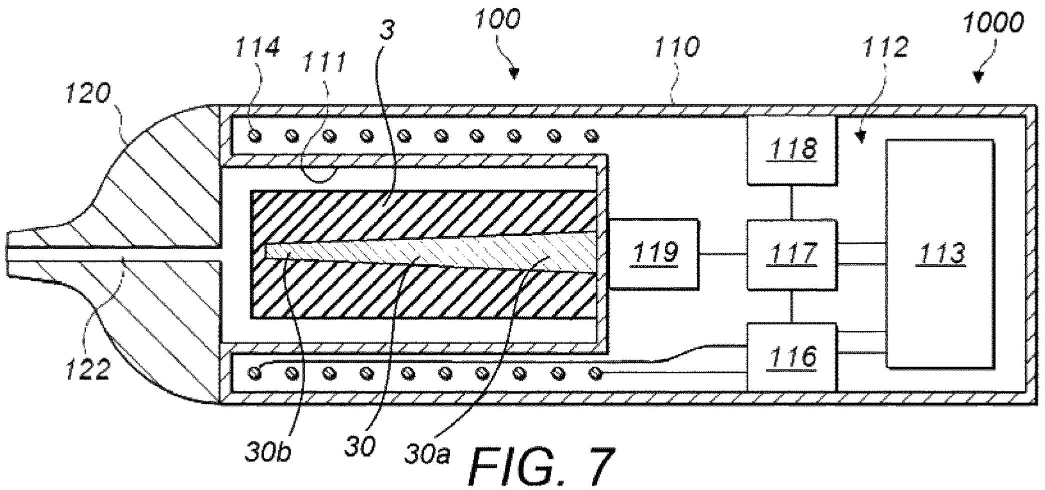
FIG. 7 shows a schematic cross-sectional view of an example of a system comprising the apparatus of FIG. 5 and an article comprising smokable material.

As the second portion 20*b* of the heating element 20 has less thermal mass than the first portion 20*a* of the heating element 20, the penetration of the heating element 20 with the varying magnetic field causes the second portion 20*b* of the heating element 20 to heat at a greater rate than the first portion 20*a* of the heating element 20. Accordingly, when an article comprising smokable material is located in the heating zone 111 in use (as shown in FIG. 7, discussed below), a first portion of the article closest to the second portion 20*b* of the heating element 20 is heated first by heat emanating from the second portion 20*b* of the heating element 20. This initiates volatilization of at least one component of the smokable material of that first portion of the article and formation of an aerosol therein. Over time, the temperature of the first portion 20*a* of the heating element 20 increases. This causes a second portion of the article closest to the first portion 20*a* of the heating element 20 to be heated by heat emanating from the first portion 20*a* of the heating element 20. In turn, this initiates volatilization of at least one component of the smokable material of the second portion of the article and formation of an aerosol therein.

Accordingly, there is provided progressive heating of the article, and thus the smokable material of the article, over time. This helps to enable an aerosol to be formed and released relatively rapidly for inhalation by a user, yet provides time-dependent release, so that aerosol continues to be formed and released even after the smokable material of the first portion of the article has ceased generating aerosol. Such cessation of aerosol generation may occur as a result of the smokable material of the first portion of the article becoming exhausted of volatilizable components of the smokable material.

It will be noted that, in this embodiment, the second portion 20*b* of the heating element 20 is closer to the channel 122 of the mouthpiece 120 than the first portion 20*a* of the heating element 20. Therefore, in use the first portion of the article to be heated to volatilize component(s) of the smokable material is also closer to the channel 122 of the mouthpiece 120 than the second portion of the article. However, in other embodiments the heating element 20 may instead be arranged relative to the channel 122 so that the second portion 20*b* of the heating element 20 is further from the channel 122 of the mouthpiece 120 than the first portion 20*a* of the heating element 20.

In this embodiment, an impedance of the coil 114 of the magnetic field generator 112 is equal, or substantially equal, to an impedance of the heating element 20. If the impedance of the heating element 20 were instead lower than the impedance of the coil 114, then the voltage generated across the heating element 20 in use may be lower than the voltage that may be generated across the heating element 20 when the impedances are matched. Alternatively, if the impedance of the heating element 20 were instead higher than the impedance of the coil 114, then the electrical current generated in the heating element 20 in use may be lower than the current that may be generated in the heating element 20 when the impedances are matched. Matching the impedances may help to balance the voltage and current to maximize the heating power generated at the heating element 20 in use. In some embodiments, the impedance of the device 116 may be equal, or substantially equal, to a combined impedance of the coil 114 and the heating element 20.

The apparatus 100 of this embodiment comprises a temperature sensor 119 for sensing a temperature of the heating zone 111. The temperature sensor 119 is communicatively connected to the controller 117, so that the controller 117 is able to monitor the temperature of the heating zone 111. On the basis of one or more signals received from the temperature sensor 119, the controller 117 may cause the device 116 to adjust a characteristic of the varying or alternating electrical current passed through the coil 114 as necessary, in order to ensure that the temperature of the heating zone 111 remains within a predetermined temperature range. The characteristic may be, for example, amplitude or frequency or duty cycle. Within the predetermined temperature range, in use the smokable material within an article located in the heating zone 111 is heated sufficiently to volatilize at least one component of the smokable material without combusting the smokable material. Accordingly, the controller 117, and the apparatus 100 as a whole, is arranged to heat the smokable material to volatilize the at least one component of the smokable material without combusting the smokable material. In some embodiments, the temperature range is about 50° C. to about 300° C., such as between about 50° C. and about 250° C., between about 50° C. and about 150° C., between about 50° C. and about 120° C., between about 50° C. and about 100° C., between about 50° C. and about 80° C., or between about 60° C. and about 70° C. In some embodiments, the temperature range is between about 170° C. and about 220° C. In other embodiments, the temperature range may be other than this range. In some embodiments, the upper limit of the temperature range could be greater than 300° C. In some embodiments, the temperature sensor 119 may be omitted. In some embodiments, the heating material may have a Curie point temperature selected on the basis of the maximum temperature to which it is desired to heat the heating material, so that further heating above that temperature by induction heating the heating material is hindered or prevented.

Figure 6:
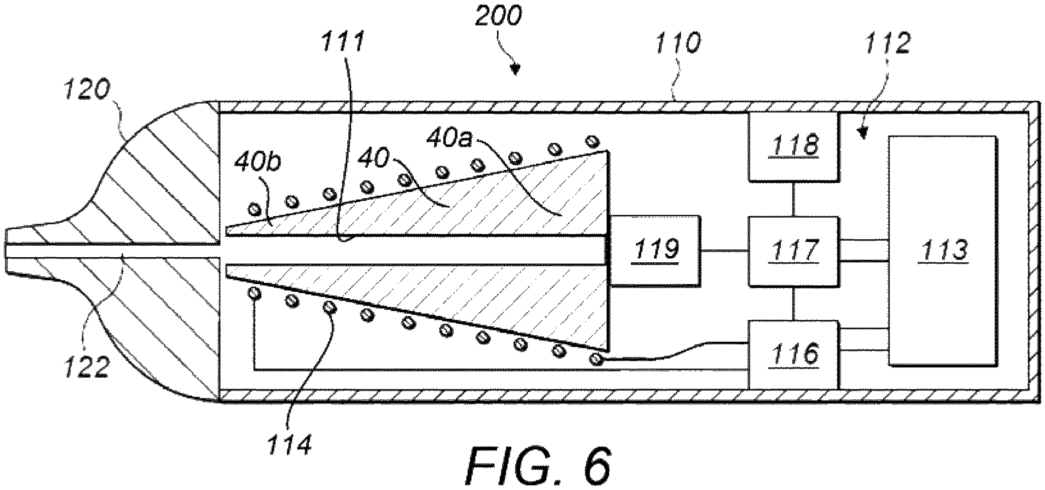
FIG. 6 shows a schematic cross-sectional view of an example of another apparatus for heating the smokable material to volatilize at least one component of the smokable material.

Referring to FIG. 6 there is shown a schematic cross-sectional view of an example of another apparatus according to an embodiment of the disclosure. The apparatus 200 of FIG. 6 is identical to the apparatus 100 of FIG. 5 except for the form of the heating element, heating zone, and coil of the apparatus. Therefore, in the interest of conciseness, features common to the two embodiments will not be described again in detail. Any of the herein-described possible variations to the apparatus 100 of FIG. 5 may be made to the apparatus 200 of FIG. 6 to form separate respective embodiments of the apparatus.

As noted above, in the apparatus 100 of FIG. 5, the heating element 20 projects into the heating zone 111. In contrast, the apparatus 200 of FIG. 6 comprises a heating element 40 of heating material that extends around the heating zone 111. Therefore, whereas in the embodiment of FIG. 5 the heating zone 111 and any article therein in use is heated from the inside outwards, in the embodiment of FIG. 6 the heating zone 111 and any article therein in use is heated from the outside inwards.

The heating element 40 is made from heating material that is heatable by penetration with a varying magnetic field. The heating element 40 is a tubular heating element 40 that encircles the heating zone 111. However, in other embodiments, the heating element 40 may not be fully tubular. For example, in some embodiments, the heating element 40 may be tubular save for an axially-extending gap or slit formed in the heating element 40. The heating element 40 has a substantially circular cross-section. However, in other embodiments, the heating element may have a cross-section other than circular, such as square, rectangular, polygonal or elliptical. The heating element 40 extends along a longitudinal axis that is substantially aligned with a longitudinal axis of the heating zone 111. In this embodiment, the aligned axes are coincident. In a variation to this embodiment, the aligned axes may be parallel to each other. However, in other embodiments, the axes may be oblique to each other.

In this embodiment, the heating zone 111 is defined at least in part by the heating element 40. That is, the heating element 40 at least partially delineates or delimits the heating zone 111. The cross-section of the heating zone 111 perpendicular to the longitudinal axis of the heating zone 111 is constant along the length of the heating zone 111, in this embodiment. However, in other embodiments, the cross-section may vary with distance along the length of the heating zone 111. In this embodiment the cross-section of the heating zone 111 is circular, but in other embodiments the cross-section of the heating zone 111 may be other than circular, such as square, rectangular, polygonal or elliptical.

When an article comprising smokable material is located in the heating zone 111, the heating element 40 is in thermal contact with the article. In some embodiments, when an article comprising smokable material is located in the heating zone 111, the heating element 40 is in surface contact with the article. Thus, heat may be conducted directly from the heating element 40 to the article. In other embodiments, the heating element may be kept out of direct surface contact with the article. Examples of how this may be achieved, and benefits that may be attained by doing so, are as discussed above.

Similarly to the heating element 20 of the embodiment of FIG. 5, the heating element 40 of the embodiment of FIG. 6 has a first portion 40*a* and a second portion 40*b*, wherein the first and second portions 40*a*, 40*b* of the heating element 40 have different respective thermal masses. In this embodiment, the material composition of the heating material, including the density of the heating material, of the first portion 40*a* of the heating element 40 is the same as the material composition of the heating material of the second portion 40*b* of the heating element 40. Moreover, in this embodiment, the material composition of the heating material, including the density of the heating material, is homogenous throughout the heating element 40. The first and second portions 40*a*, 40*b* of the heating element 40 have different respective thermal masses as a result of a thickness of the first portion 40*a* of the heating element 40 being different to a thickness of the second portion 40*b* of the heating element 40.

Figure 8:
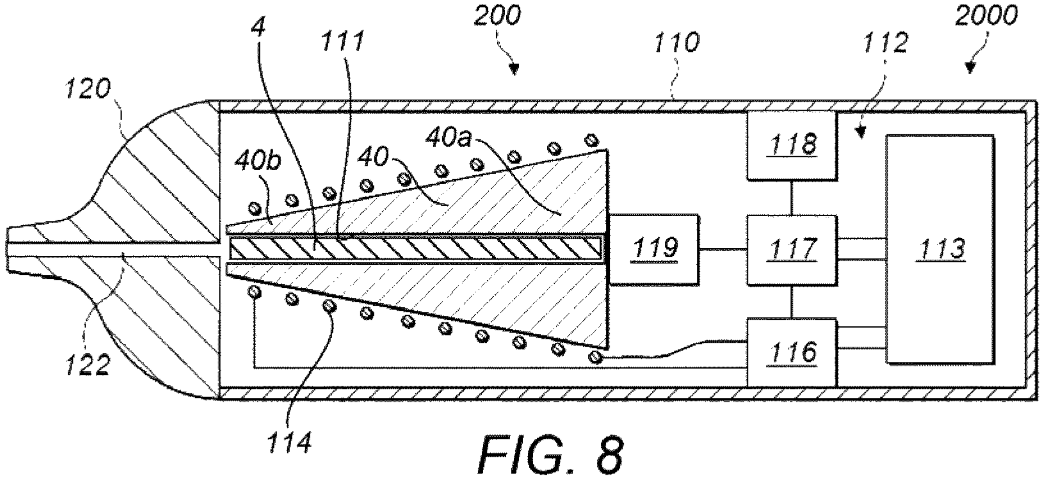
FIG. 8 shows a schematic cross-sectional view of an example of another system comprising the apparatus of FIG. 6 and an article comprising smokable material.

More specifically, and as will be appreciated from consideration of FIG. 6, the first portion 40*a* of the heating element 40 has a greater thickness, and therefore a greater thermal mass, than the second portion 40*b* of the heating element 40. The second portion 40*b* of the heating element 40 is therefore heatable by penetration with a given varying magnetic field at a greater rate than the first portion 40*a* of the heating element 40. Accordingly, during penetration on the heating element 40 with the varying magnetic field generated by the generator 112, a similar progressive heating effect to that discussed above can be provided. That is, in use, when an article is located in the heating zone 111 (as shown in FIG. 8, discussed below), the second portion 40*b* of the heating element 40 is heated quickest so as to heat a first portion of the article, and the first portion 40*a* of the heating element 40 is heated more slowly to heat a second portion of the article. As also noted above, this helps to enable an aerosol to be formed and released relatively rapidly for inhalation by a user, yet provides time-dependent release, so that aerosol continues to be formed and released even after the smokable material of the first portion of the article has ceased generating aerosol.

In this embodiment, the first and second portions 40*a*, 40*b* of the heating element 40 are at opposite ends of the heating element 40. However, in other embodiments, one of the first and second portions 40*a*, 40*b* of the heating element 40 may be located between two of the other of the first and second portions 40*a*, 40*b* of the heating element 40. That is, in some embodiments, the heating element 40 may have a relatively thick portion between two relatively thin portions, or may have a relatively thin portion between two relatively thick portions.

As for the previous embodiment, the second portion 40*b* of the heating element 40 is closer to the channel 122 of the mouthpiece 120 than the first portion 40*a* of the heating element 40. However, in other embodiments the heating element 40 may instead be arranged relative to the channel 122 so that the opposite is true.

The thermal mass of the heating element 40 of FIG. 6 varies over the full length of the heating element 40, as a result of the thickness of the heating element 40 correspondingly varying over the full length of the heating element 40. In other embodiments, the thermal mass may vary over only a majority of the length of the heating element, or over only a portion of the length of the heating element. Again, this may be due to appropriate selection of changes in the thickness of the heating element 40 along its length. Furthermore, in this embodiment, the thermal mass reduces continuously with distance along the length of the heating element 40 from the first portion 40*a* of the heating element 40 to the second portion 40*b* of the heating element 40. More specifically, in this embodiment, the thermal mass reduces linearly, or substantially linearly, with distance along the length. This is due to the thickness of the heating element 40 reducing linearly, or substantially linearly, with distance along the length of the heating element 40. Accordingly, in use the heating element 40 is progressively heatable at a constant, or substantially constant, rate along its length. However, in other embodiments, the thermal mass may vary other than continuously with distance along the length of the heating element 40 from the first portion 40*a* to the second portion 40*b*. For example, the variation may be stepwise, or continuous over at least one section of the heating element 40 and stepwise over at least one other section of the heating element 40.

In this embodiment, as noted above, the cross-section of the heating zone 111 perpendicular to the longitudinal axis of the heating zone 111 is constant along the length of the heating zone 111. Moreover, as also noted above, the thickness or diameter of the heating element 40 varies linearly with distance along the length of the heating element 40. Therefore, the heating element 40 is conical or frustoconical. It will be noted that the coil 114 of this embodiment extends along an axis that is substantially coincident with the longitudinal axis of the heating zone 111. The coil 114 has a diameter that varies with distance along the longitudinal axis of the heating zone 111 so that the coil is a conic helix. However, in other embodiments, the coil 114 may have a substantially constant diameter along its full length so that the coil 114 is a circular helix.

In a variation to this embodiment, the apparatus may comprise both the heating element 40 that extends at least partially around the heating zone 111, and another heating element that protrudes into the heating zone 111, similar to the heating element 20 of the embodiment of FIG. 5. Such an embodiment may help deliver heating of the heating zone 111 and any article therein in use from both the middle and the outside.

Referring to FIGS. 7 and 8 there are shown schematic cross-sectional views of examples of systems according to respective embodiments of the disclosure. The system 1000 of FIG. 7 comprises the apparatus 100 of FIG. 5 and an article 3 comprising smokable material. The system 2000 of FIG. 8 comprises the apparatus 200 of FIG. 6 and an article 4 comprising smokable material. The heating zone 111 of each of the apparatuses 100, 200 is for receiving the article 3, 4 of the respective system 1000, 2000. In each of these embodiments, the article 3, 4 is insertable into the heating zone 111 of the respective apparatus 100, 200 when the mouthpiece 120 is disengaged from the body 110 of the respective apparatus 100, 200. In each system 1000, 2000, operation of the magnetic field generator 112 generates a varying magnetic field that penetrates the heating element 20, 40 as discussed above, to cause progressive heating of the heating element 20, 40. In turn, the progressive heating of the heating element 20, 40 causes progressive heating of the smokable material of the respective article 3, 4, such as to volatilize at least one component of the smokable material without combusting the smokable material as also discussed above.

In the interest of conciseness, the apparatuses 100, 200 will not be described again in detail. Any of the herein-described possible variations to the apparatuses 100, 200 of FIGS. 5 and 6 may be made to the apparatuses 100, 200 of the systems 1000, 2000 of FIGS. 7 and 8 to form separate respective embodiments of systems.

Figure 9:
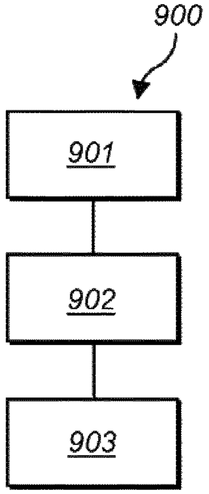
FIG. 9 shows a flow diagram showing an example of a method of heating smokable material to volatilize at least one component of the smokable material.

Referring to FIG. 9 there is shown a flow diagram showing an example of a method of heating smokable material to volatilize at least one component of the smokable material according to an embodiment of the disclosure.

The method 900 comprises providing 901 a heating element formed from heating material that is heatable by penetration with a varying magnetic field, wherein first and second portions of the heating element have different respective thermal masses. The heating element could, for example, be a heating element of apparatus for heating smokable material to volatilize at least one component of the smokable material, such as one of the heating elements 20, 40 discussed above with reference to FIGS. 5 and 6. Alternatively, the heating element could, for example, be a heating element of an article comprising the smokable material, such as one of the heating elements 10, 20 discussed above with reference to FIGS. 3 and 4. The thermal masses may differ as a result of the density or the thickness of the first and second portions of the heating element differing.

The method also comprises providing 902 smokable material in thermal contact with the heating element. The smokable material could be comprised in an article, such as that shown in FIG. 3 or that shown in FIG. 4. The smokable material may be in thermal contact with the heating element as a result of the heating element also being part of the article, as is the case in FIGS. 3 and 4. Alternatively, the smokable material may be placed in thermal contact with the heating element as a result of inserting smokable material into the heating zone of an apparatus comprising the heating element, as is the case in FIGS. 5 and 6.

The method further comprises penetrating 903 the heating element with a varying magnetic field so that the penetrating causes progressive heating of the heating element and thereby progressive heating of the smokable material. Examples of such progressive heating are described above. The heating of the smokable material may be such as to volatilize at least one component of the smokable material without combusting the smokable material.

In each of the embodiments discussed above the heating material is steel. However, in other embodiments, the heating material may comprise one or more materials selected from the group consisting of: an electrically-conductive material, a magnetic material, and a magnetic electrically-conductive material. In some embodiments, the heating material may comprise a metal or a metal alloy. In some embodiments, the heating material may comprise one or more materials selected from the group consisting of: aluminum, gold, iron, nickel, cobalt, conductive carbon, graphite, plain-carbon steel, stainless steel, ferritic stainless steel, copper, and bronze. Other heating material(s) may be used in other embodiments. It has been found that, when magnetic electrically-conductive material is used as the heating material, magnetic coupling between the magnetic electrically-conductive material and an electromagnet of the apparatus in use may be enhanced. In addition to potentially enabling magnetic hysteresis heating, this can result in greater or improved Joule heating of the heating material, and thus greater or improved heating of the smokable material.

In each of the embodiments discussed above the heating element consists of, or consists essentially of, the heating material. However, in other embodiments, this may not be the case.

The heating material may have a skin depth, which is an exterior zone within which most of an induced electrical current and/or induced reorientation of magnetic dipoles occurs. By providing that the heating material has a relatively small thickness, a greater proportion of the heating material may be heatable by a given varying magnetic field, as compared to heating material having a depth or thickness that is relatively large as compared to the other dimensions of the heating material. Thus, a more efficient use of material is achieved and, in turn, costs are reduced.

In each of the above described embodiments, the smokable material comprises tobacco. However, in respective variations to each of these embodiments, the smokable material may consist of tobacco, may consist substantially entirely of tobacco, may comprise tobacco and smokable material other than tobacco, may comprise smokable material other than tobacco, or may be free from tobacco. In some embodiments, the smokable material may comprise a vapor or aerosol forming agent or a humectant, such as glycerol, propylene glycol, triacetin, or diethylene glycol.

In each of the above described embodiments, the smokable material is non-liquid smokable material, and the apparatus is for heating non-liquid smokable material to volatilize at least one component of the smokable material. In other embodiments, the opposite may be true.

In each of the above described embodiments, the article 1, 2, 3, 4 is a consumable article. Once all, or substantially all, of the volatilizable component(s) of the smokable material 60 in the article 1, 2, 3, 4 has/have been spent, the user may remove the article 1, 2, 3, 4 from the apparatus 100, 200 and dispose of the article 1, 2, 3, 4. The user may subsequently re-use the apparatus 100, 200 with another of the articles 1, 2, 3, 4. However, in other respective embodiments, the article may be non-consumable, and the apparatus and the article may be disposed of together once the volatilizable component(s) of the smokable material has/have been spent.

In some embodiments, the apparatus 100, 200 is sold, supplied or otherwise provided separately from the articles 1, 2, 3, 4 with which the apparatus 100, 200 is usable. However, in some embodiments, the apparatus 100, 200 and one or more of the articles 1, 2, 3, 4 may be provided together as a system, such as a kit or an assembly, possibly with additional components, such as cleaning utensils.

In order to address various issues and advance the art, the entirety of this disclosure shows by way of illustration and example various embodiments in which the claimed invention may be practiced and which provide for superior heating elements for use with an apparatus for heating smokable material to volatilize at least one component of the smokable material, superior articles comprising such heating elements and usable with such an apparatus, superior apparatus comprising such heating elements and for heating smokable material to volatilize at least one component of the smokable material, superior systems comprising such an apparatus, and superior methods of heating smokable material to volatilize at least one component of the smokable material. The advantages and features of the disclosure are of a representative sample of embodiments only, and are not exhaustive and/or exclusive. They are presented only to assist in understanding and teach the claimed and otherwise disclosed features. It is to be understood that advantages, embodiments, examples, functions, features, structures and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist in essence of, various combinations of the disclosed elements, components, features, parts, steps, means, etc. The disclosure may include other inventions not presently claimed, but which may be claimed in future.

The invention claimed is:

1. A heating element for use with an apparatus for heating smokable material to volatilize at least one component of the smokable material, the heating element formed from heating material that is heatable by penetration with a varying magnetic field, the heating element comprising:

a first portion and a second portion, each having different respective thermal masses.

2. The heating element of claim 1, wherein the thermal mass of the heating element varies with distance along the heating element.

3. The heating element of claim 2, wherein the thermal mass of the heating element varies over at least a majority of a length of the heating element.

4. The heating element of claim 2, wherein the thermal mass of the heating element reduces continuously with distance along the heating element.

5. The heating element of claim 2, wherein the thermal mass of the heating element reduces linearly with distance along the heating element.

6. The heating element of claim 1, wherein the first portion and the second portion of the heating element have different respective thermal masses as a result of a density of the first portion of the heating element being different to a density of the second portion of the heating element.

7. The heating element of claim 1, wherein the first portion and the second portion of the heating element have different respective thermal masses as a result of a thickness of the first portion of the heating element being different to a thickness of the second portion of the heating element.

8. The heating element of claim 1, wherein the first portion and the second portion of the heating element have different respective thermal masses as a result of a material composition of the first portion of the heating element being different to a material composition of the second portion of the heating element.

9. The heating element of claim 1, wherein a material composition of the heating material of the first portion of the heating element is the same as a material composition of the heating material of the second portion of the heating element.

10. The heating element of claim 1, wherein the heating material comprises one or more materials selected from the group consisting of: an electrically-conductive material, a magnetic material, and a magnetic electrically-conductive material.

11. The heating element of claim 1, wherein the heating material comprises a metal or a metal alloy.

12. The heating element of claim 1, wherein the heating material comprises one or more materials selected from the group consisting of: aluminum, gold, iron, nickel, cobalt, conductive carbon, graphite, plain-carbon steel, stainless steel, ferritic stainless steel, copper, and bronze.

13. An article for use with an apparatus for heating smokable material to volatilize at least one component of the smokable material, the article comprising:

a heating element formed from heating material that is heatable by penetration with a varying magnetic field; and the smokable material in thermal contact with the heating element, wherein a first portion and a second portion of the heating element have different respective thermal masses.

14. The article of claim 13, wherein the smokable material is in surface contact with the heating element.

15. The article of claim 13, wherein the smokable material comprises at least one of tobacco or one or more humectants.

16. An apparatus for heating smokable material to volatilize at least one component of the smokable material, the apparatus comprising:

a magnetic field generator for generating a varying magnetic field; and a heating element formed from heating material that is heatable by penetration with the varying magnetic field, wherein a first portion and a second portion of the heating element have different respective thermal masses.

17. The apparatus of claim 16, comprising a heating zone for receiving at least a portion of an article comprising smokable material, wherein the heating element projects into the heating zone.

18. The apparatus of claim 16, comprising a heating zone for receiving at least a portion of an article comprising smokable material, wherein the heating element extends at least partially around the heating zone.

19. A system for heating smokable material to volatilize at least one component of the smokable material, the system comprising:

an article comprising smokable material;

an apparatus comprising a heating zone for receiving at least a portion of the article, and a magnetic field generator for generating a varying magnetic field to be used in heating the smokable material when the portion of the article is in the heating zone; and a heating element formed from heating material that is heatable by penetration with the varying magnetic field when the portion of the article is in the heating zone, wherein a first portion and a second portion of the heating element have different respective thermal masses.

20. A method of heating smokable material to volatilize at least one component of the smokable material, the method comprising:

providing a heating element formed from heating material that is heatable by penetration with a varying magnetic field, wherein a first portion and a second portion of the heating element have different respective thermal masses;

providing smokable material in thermal contact with the heating element; and penetrating the heating material with a varying magnetic field so that the penetrating causes progressive heating of the heating element and thereby progressive heating of the smokable material.

* * * * *